(12) United States Patent
Decker

(10) Patent No.: US 12,038,172 B2
(45) Date of Patent: Jul. 16, 2024

(54) WICKS FOR CANDLES AND OTHER LIGHTING DEVICES

(71) Applicant: LUMETIQUE, INC., Laguna Beach, CA (US)

(72) Inventor: DayNa Decker, Laguna Beach, CA (US)

(73) Assignee: LUMETIQUE, INC., Laguna Beach, CA (US)

( * ) Notice: Subject to any disclaimer, the term of this patent is extended or adjusted under 35 U.S.C. 154(b) by 791 days.

(21) Appl. No.: 17/072,376

(22) Filed: Oct. 16, 2020

(65) Prior Publication Data

US 2021/0033278 A1 Feb. 4, 2021

Related U.S. Application Data

(63) Continuation of application No. PCT/US2019/027651, filed on Apr. 16, 2019.

(60) Provisional application No. 62/658,156, filed on Apr. 16, 2018.

(51) Int. Cl.
*C11C 5/00* (2006.01)
*B23K 26/362* (2014.01)
*B23K 26/402* (2014.01)
*F23D 3/08* (2006.01)

(52) U.S. Cl.
CPC ............ *F23D 3/08* (2013.01); *B23K 26/362* (2013.01); *B23K 26/402* (2013.01); *C11C 5/004* (2013.01); *C11C 5/006* (2013.01)

(58) Field of Classification Search
CPC ................ C11C 5/02; F23D 3/08; F23D 3/16
USPC ..................... 431/288–297; D26/6
See application file for complete search history.

(56) References Cited

U.S. PATENT DOCUMENTS

| 3,582,251 A | 6/1971 | Concannon | |
| 5,633,225 A | 5/1997 | Fredj et al. | |
| 6,056,541 A * | 5/2000 | Gerszewski | C11C 5/008 431/288 |
| 6,111,055 A * | 8/2000 | Berger | C11C 5/004 431/291 |

(Continued)

FOREIGN PATENT DOCUMENTS

| EP | 0020292 A1 | 12/1980 |
| EP | 3037510 A1 | 6/2016 |

(Continued)

OTHER PUBLICATIONS

International Search Report dated Aug. 16, 2019 in PCT/US19/27651, 4 pages.

(Continued)

*Primary Examiner* — Ko-Wei Lin
(74) *Attorney, Agent, or Firm* — Element IP, PLC

(57) ABSTRACT

A wick includes a sheet of wick material. The wick has a height dimension, a width dimension, and a thickness dimension. The height dimension and the width dimension are greater than the thickness dimension. The height dimension extends from the top of the wick to the bottom of the wick as the wick is oriented when provided in a candle. The width dimension and the thickness dimension are perpendicular to the height dimension. The sheet of wick material may be dyed, provided with a visible pattern and/or provided with a plurality of cut-out portions.

11 Claims, 24 Drawing Sheets

(56) References Cited

U.S. PATENT DOCUMENTS

| | | | |
|---|---|---|---|
| 6,242,509 B1* | 6/2001 | Berger | A61K 8/042 424/78.02 |
| 6,428,311 B1 | 8/2002 | Bernardo | |
| D643,554 S | 8/2011 | Decker | |
| D644,359 S | 8/2011 | Decker | |
| D644,360 S | 8/2011 | Decker | |
| D663,450 S | 7/2012 | Delcotto et al. | |
| D669,615 S | 10/2012 | Delcotto et al. | |
| 8,348,662 B2 | 1/2013 | Decker | |
| D678,558 S* | 3/2013 | Decker | D26/6 |
| 8,708,694 B2 | 4/2014 | Delcotto et al. | |
| D705,459 S | 5/2014 | Decker | |
| D708,777 S | 7/2014 | Delcotto et al. | |
| D715,989 S | 10/2014 | Delcotto et al. | |
| 8,961,171 B2 | 2/2015 | Decker | |
| 9,039,409 B2 | 5/2015 | Decker | |
| 9,120,995 B2 | 9/2015 | Delcotto et al. | |
| D740,461 S | 10/2015 | Decker | |
| 9,261,275 B2* | 2/2016 | Decker | F23D 3/16 |
| 9,388,365 B2 | 7/2016 | Delcotto et al. | |
| 9,410,696 B2 | 8/2016 | Decker | |
| 9,796,946 B2 | 10/2017 | Delcotto et al. | |
| 9,816,053 B2 | 11/2017 | Delcotto | |
| 2001/0038987 A1* | 11/2001 | Jun | F23D 3/18 431/324 |
| 2002/0032982 A1* | 3/2002 | Berger | C11C 5/008 44/275 |
| 2004/0009447 A1 | 1/2004 | Decker | |
| 2005/0037308 A1* | 2/2005 | Decker | F23D 3/16 431/325 |
| 2005/0095546 A1* | 5/2005 | Campbell | F23D 3/16 431/325 |
| 2008/0153046 A1* | 6/2008 | Delcotto | C11C 5/006 144/350 |
| 2008/0268390 A1* | 10/2008 | Alusi | C11C 5/008 431/288 |
| 2011/0024945 A1 | 2/2011 | Decker | |
| 2011/0027735 A1 | 2/2011 | Decker | |
| 2011/0027736 A1 | 2/2011 | Decker | |
| 2011/0027737 A1 | 2/2011 | Decker | |
| 2012/0064467 A1 | 3/2012 | Delcotto et al. | |
| 2012/0129114 A1* | 5/2012 | Barresi | F21V 37/00 431/291 |
| 2012/0225392 A1 | 9/2012 | Decker | |
| 2012/0264069 A1* | 10/2012 | Ramirez | C11C 5/008 431/325 |
| 2013/0157207 A1* | 6/2013 | Spangler | C11C 5/006 431/325 |
| 2014/0154636 A1* | 6/2014 | Thompson | F23D 3/16 431/126 |
| 2015/0125797 A1* | 5/2015 | Masterson | F23D 5/04 431/353 |
| 2015/0322379 A1 | 11/2015 | Delcotto et al. | |
| 2016/0272922 A1* | 9/2016 | DelCotto | F23D 3/16 |
| 2016/0272923 A1 | 9/2016 | Delcotto et al. | |
| 2016/0281031 A1 | 9/2016 | Delcotto | |
| 2016/0298837 A1 | 10/2016 | Decker | |
| 2017/0151361 A1* | 6/2017 | Gobber | A61L 9/04 |
| 2018/0072965 A1* | 3/2018 | Han | F23Q 21/00 |

FOREIGN PATENT DOCUMENTS

| | | |
|---|---|---|
| ES | 2556257 A1 | 1/2016 |
| FR | 2811676 A1 | 1/2002 |
| WO | WO-2005076770 A2 | 8/2005 |
| WO | WO-2005076770 A3 | 8/2005 |

OTHER PUBLICATIONS

Written Opinion dated Aug. 16, 2019 in PCT/US19/27651, 12 pages.

Extended European Search Report dated Jan. 21, 2022 in European Patent Application No. 19787651.9, 7 pages.

* cited by examiner

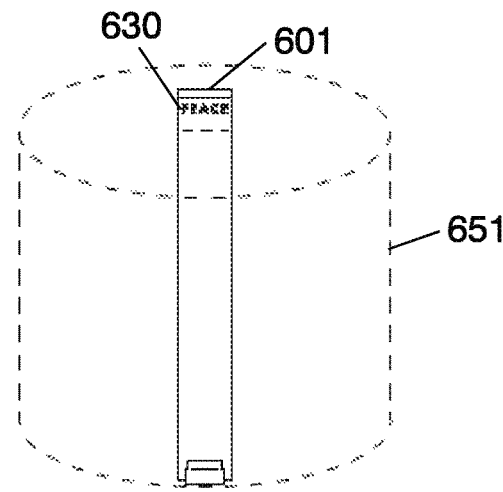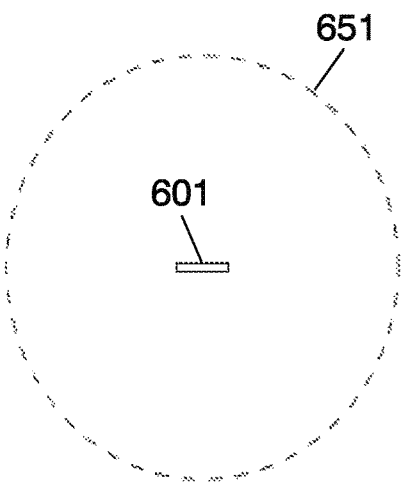
FIG. 6D          FIG. 6E
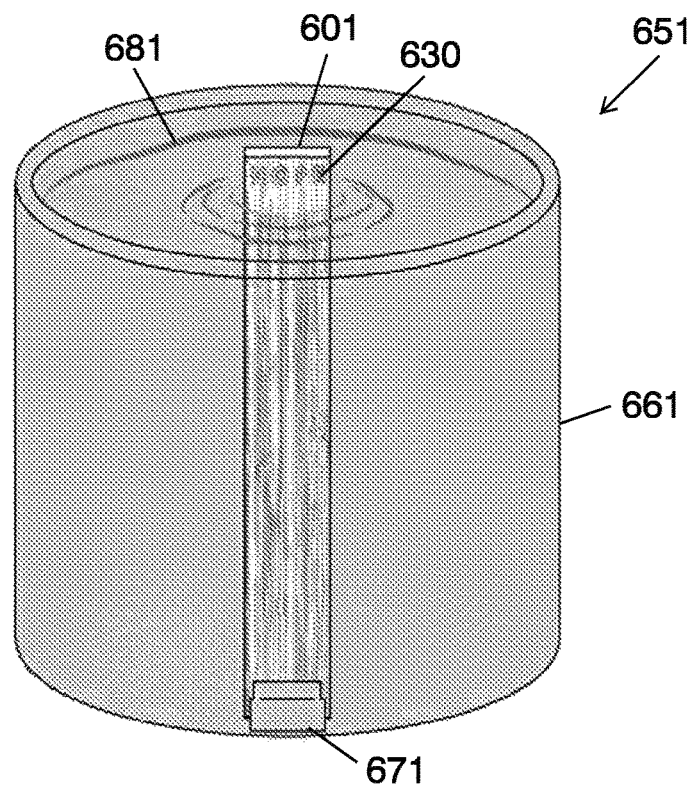
FIG. 6F

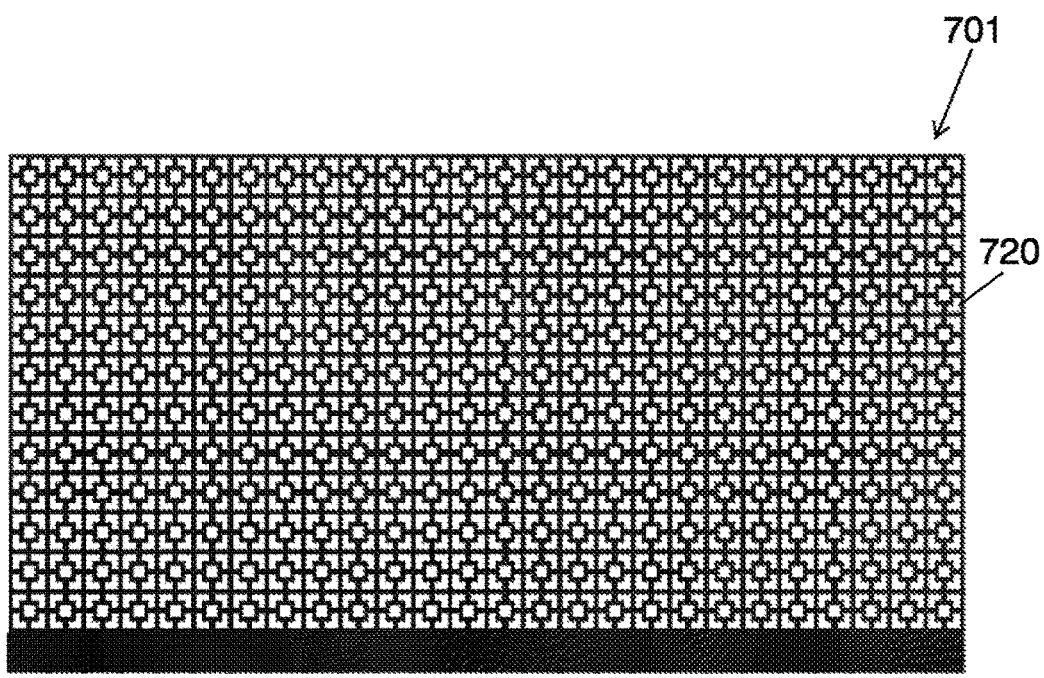
FIG. 7A
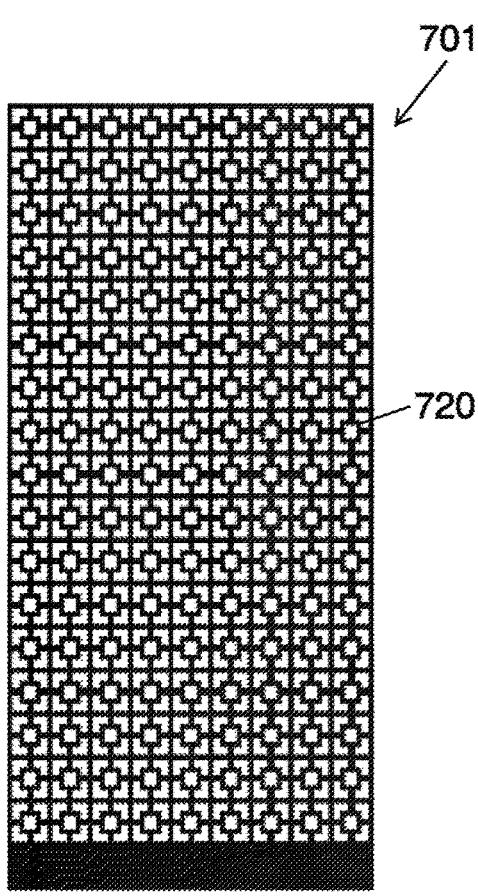 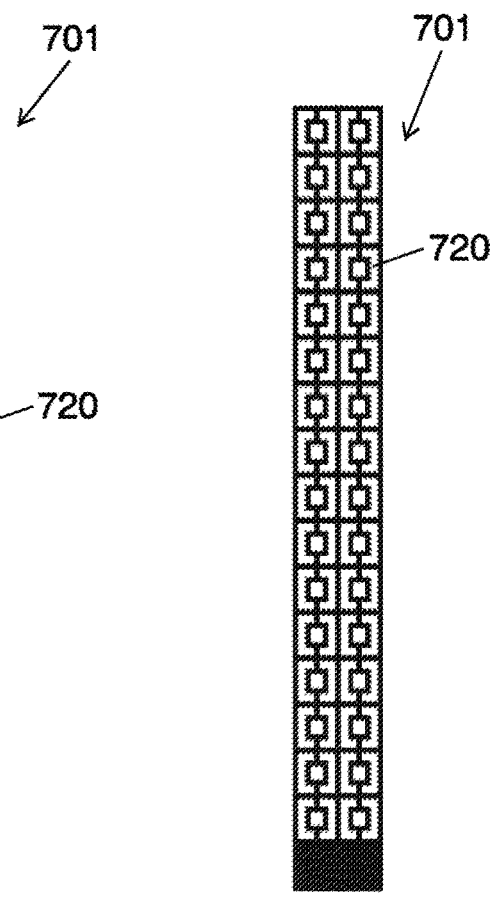
FIG. 7B      FIG. 7C

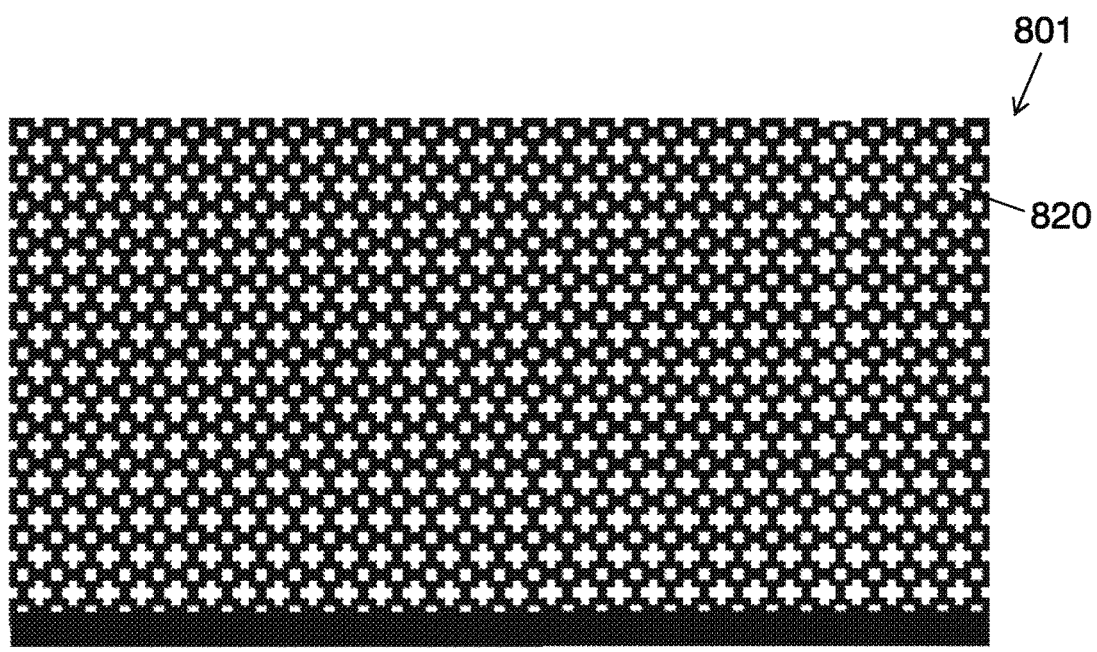
FIG. 8A
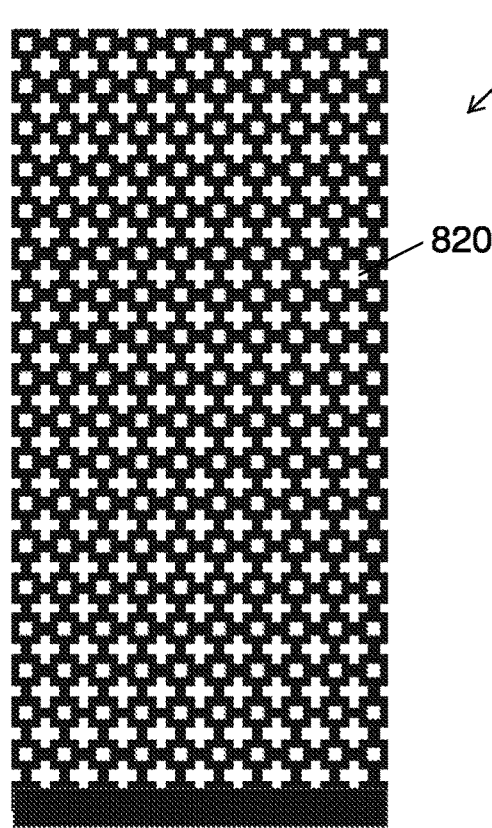 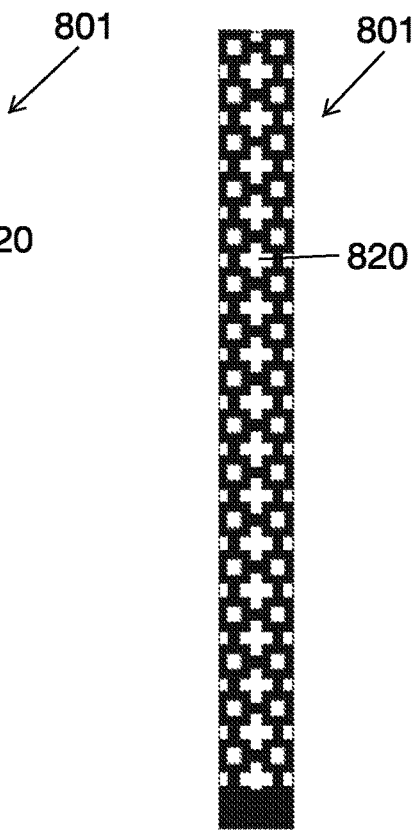
FIG. 8B          FIG. 8C

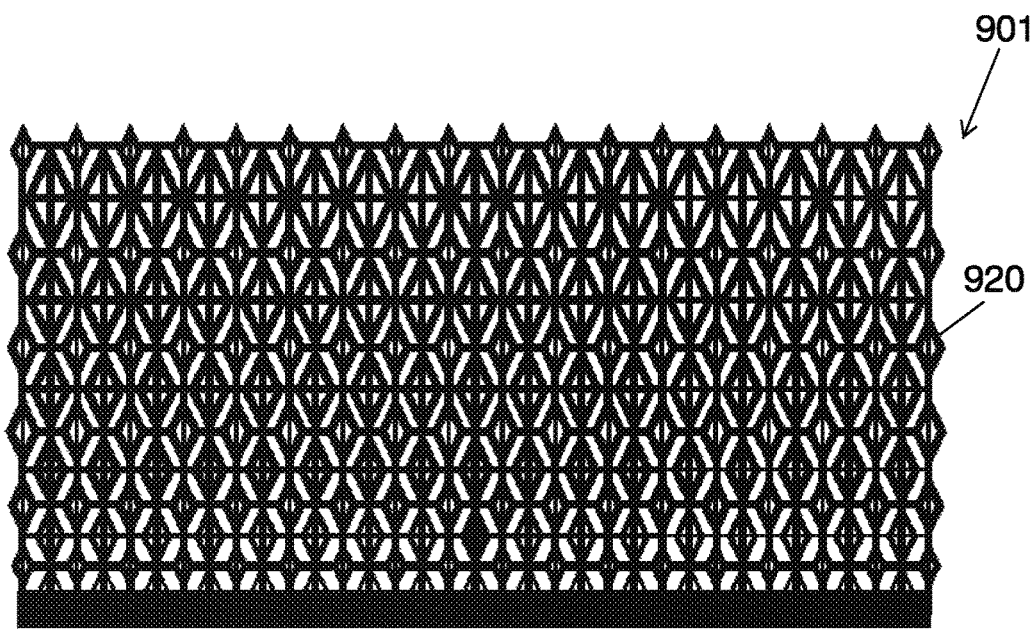
FIG. 9A
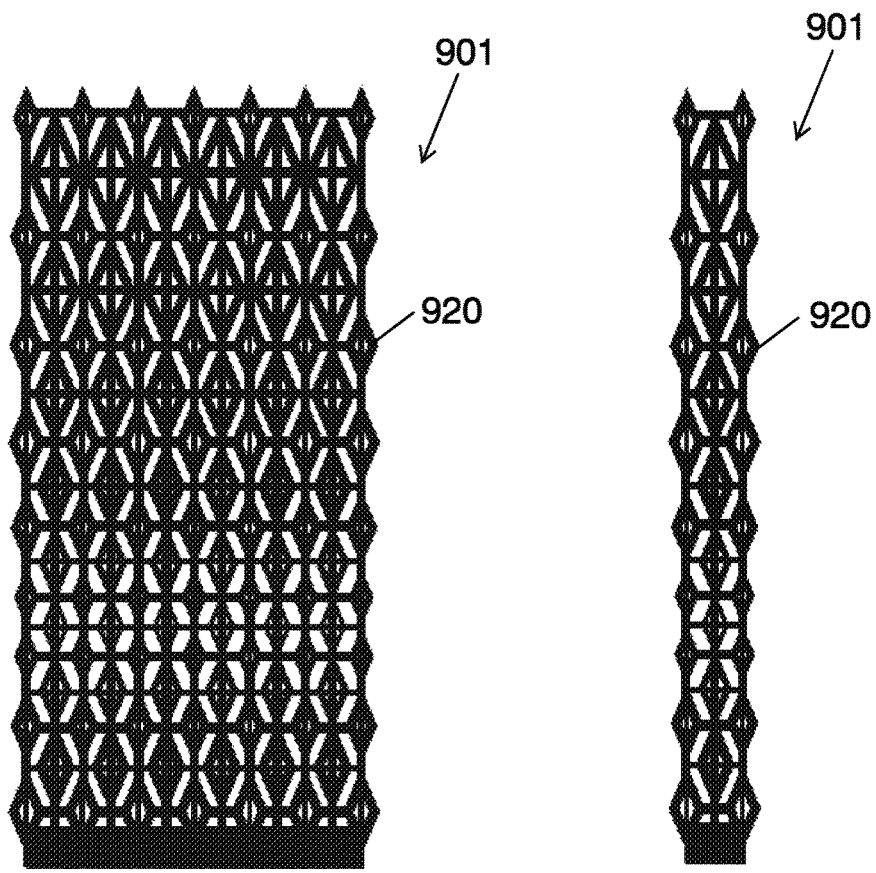
FIG. 9B
FIG. 9C

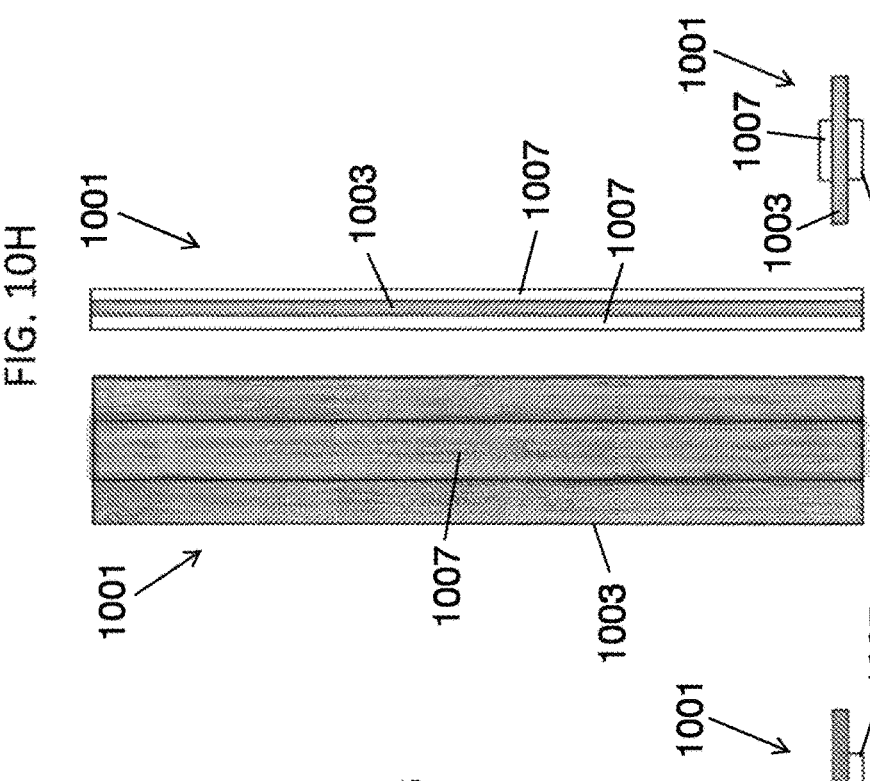
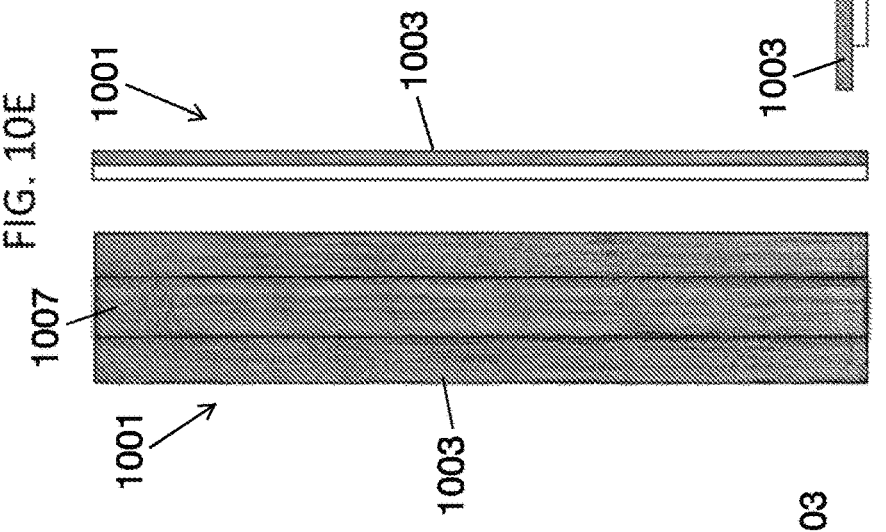
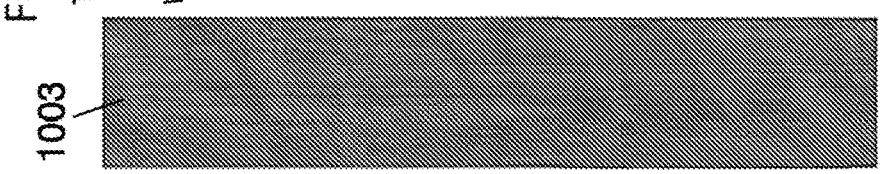

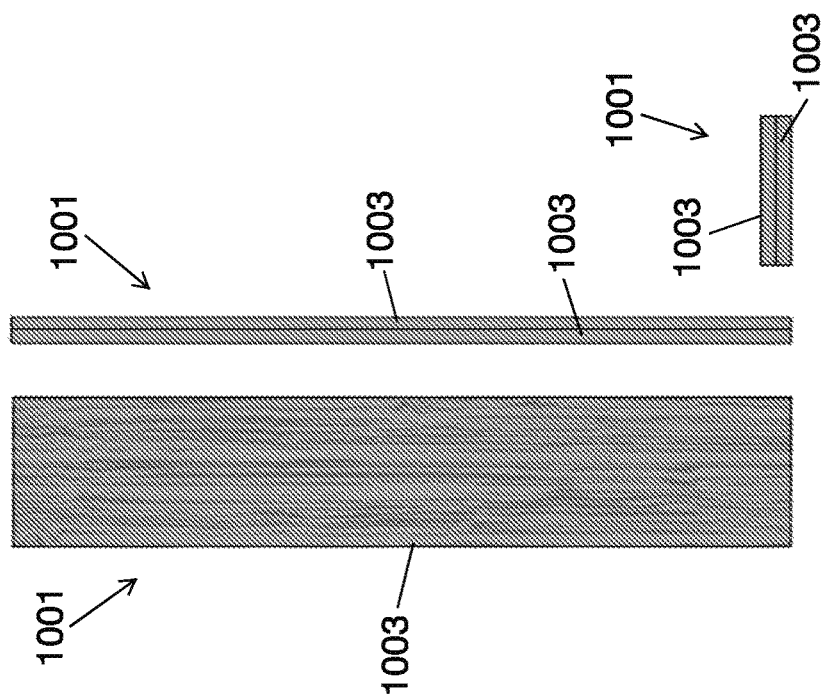
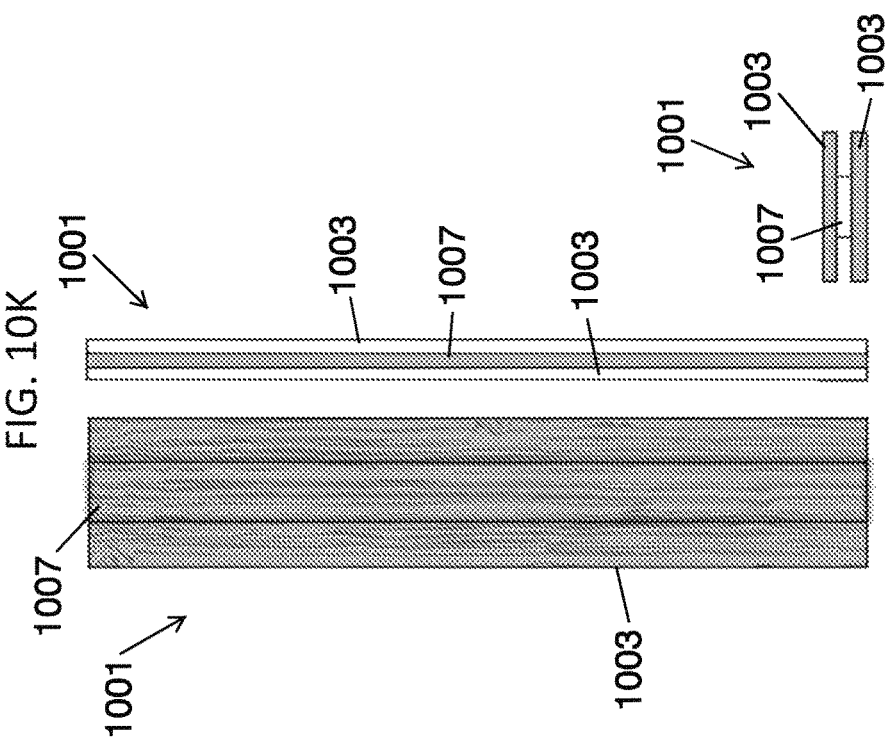

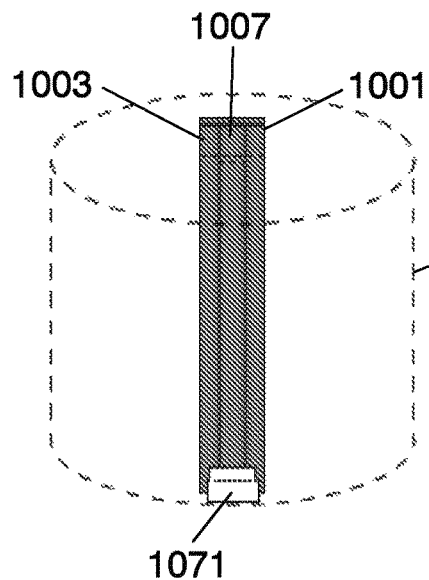
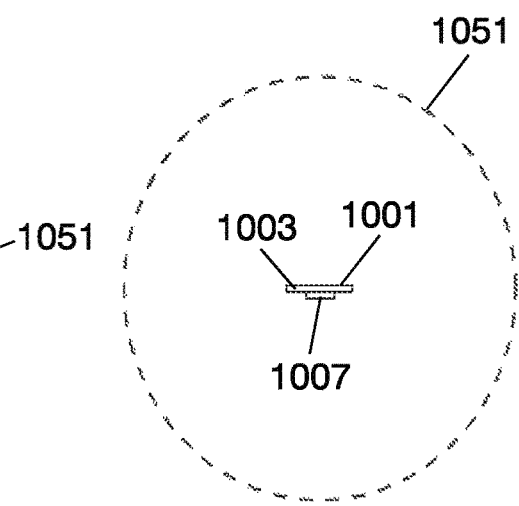
FIG. 10P  FIG. 10Q
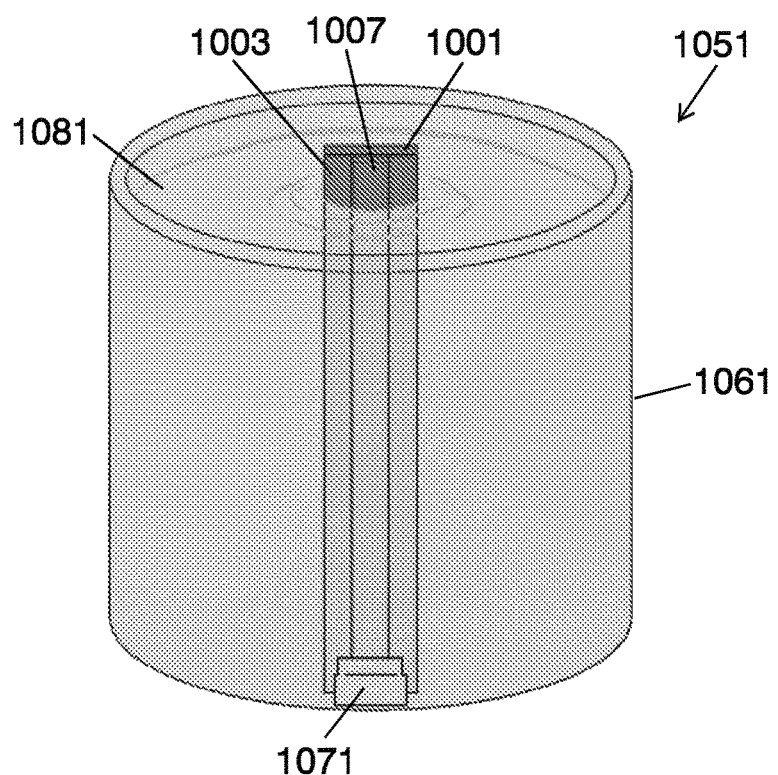
FIG. 10R

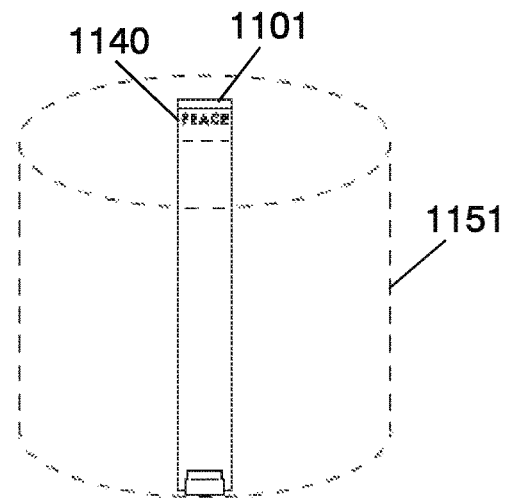
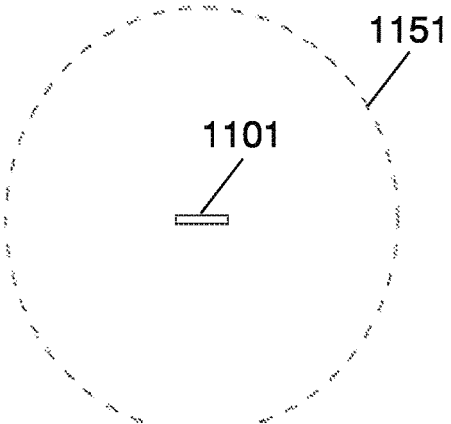
FIG. 11D   FIG. 11E
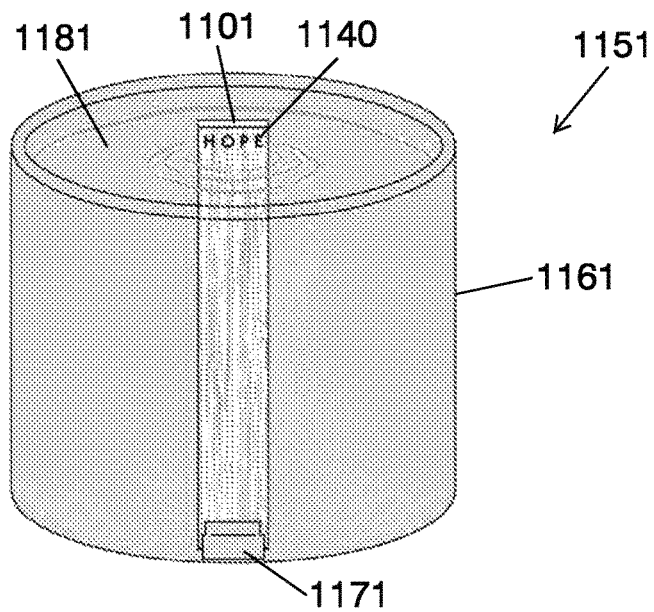
FIG. 11F

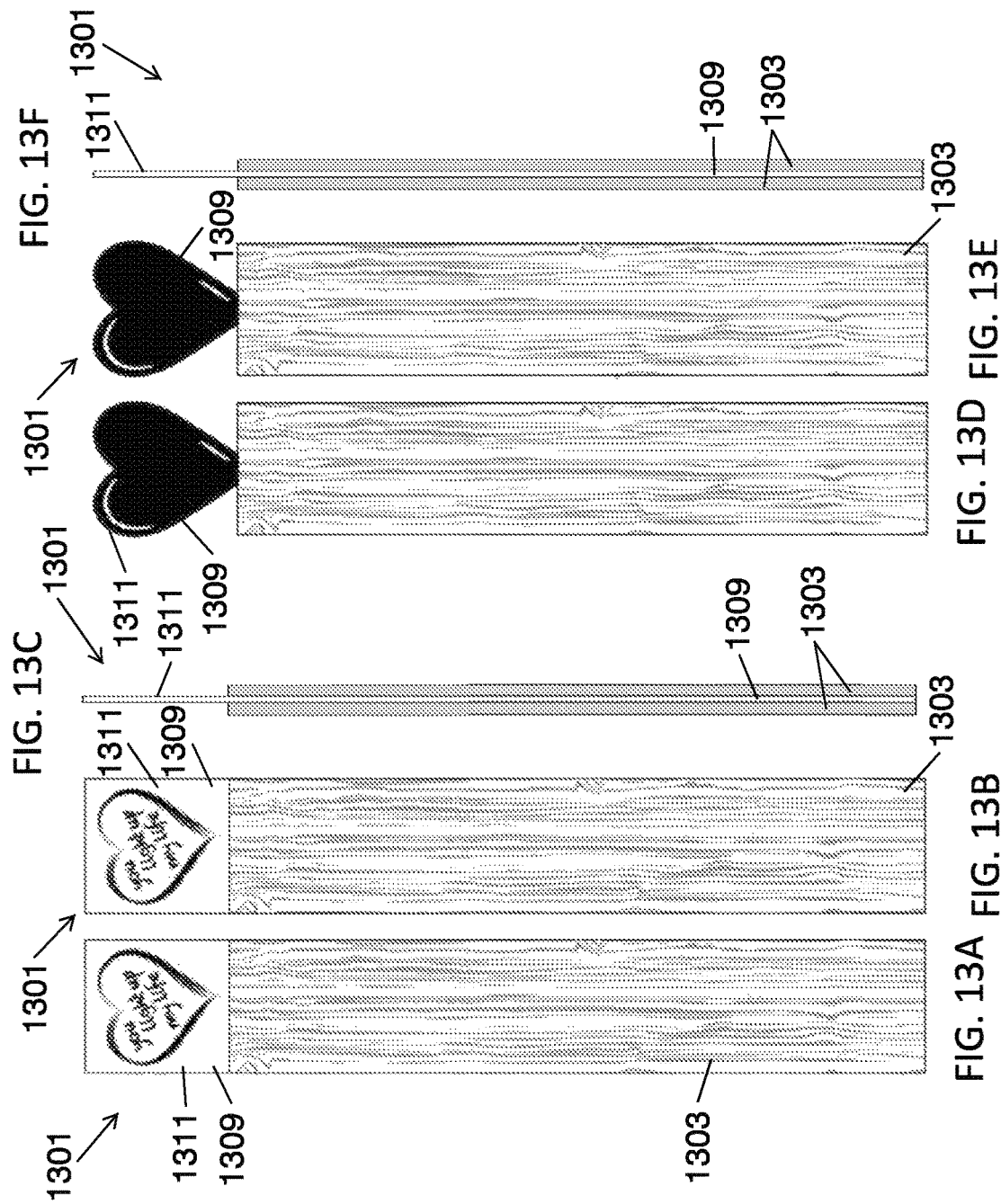

WICKS FOR CANDLES AND OTHER LIGHTING DEVICES

CROSS-REFERENCE TO RELATED APPLICATIONS

This application is a continuation of International Application No. PCT/US2019/027651, filed Apr. 16, 2019, the disclosure of which is incorporated herein by reference in its entirety. This application claims priority to U.S. Provisional Patent Application No. 62/658,156, filed Apr. 16, 2018, the disclosure of which is incorporated herein by reference in its entirety.

BACKGROUND OF THE DISCLOSURE

Technical Field

The present disclosure relates to wicks for use in candles and other lighting devices, candles and other lighting devices employing such wicks, and methods of preparing such wicks, candles, and other lighting devices.

DESCRIPTION OF THE RELATED ART

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present disclosure.

A candle may include an ignitable wick embedded in wax or another flammable solid substance such as tallow that provides light, and in some cases, a fragrance. A candle may also be used to provide heat or keep time. A candle wick is typically made of braided cotton that holds the flame of the candle. A candle wick works by capillary action, conveying (or "wicking") molten fuel to the flame. When a molten fuel such as melted wax reaches the flame the fuel vaporizes and combusts. A candle wick influences how a candle burns. Important characteristics of a candle wick include diameter, stiffness, fire-resistance, and tethering.

Candles may present safety issues, particularly with respect to causing fires and burning users. In view of these issues, efforts have been made to test various aspects of the manner in which candles burn including, for example, stability, burn time, abnormalities, smoke/flaring, sputter, overflow, re-ignition, flame height, afterglow, external surface temperature (thermocouple), direct flame impingement, pool temperature, pool uniformity, pool diameter, carbon deposit, and soot emissions. These parameters contribute not only to the safety of a candle, but also to the performance and aesthetic characteristics of a candle.

Candle wicks have been woven or braided for well over the last century. Such conventional wicks may be woven from multiple fibers or filamentary yarns. The most commonly used yarn is cotton, although other natural fibers such as rayon, nylon, and hemp have also been used. Braided wicks may be produced in various sizes, shapes and constructions to achieve desired performance (flame height, wax pool size, self-trimming) and process (stability, self-supporting) requirements. The appropriate wick selection for a particular candle includes type of weave, core, size (diameter or width), and density of a wick. Even if wick selection is confined to braided wicks, there are many different types of braided wicks from which to choose.

More recent developments in candle design and manufacture involve the use of a planar wick in a candle. Such planar wicks may be made of wood, wood-like materials, semi-wood materials, cellulose materials, and other more rigid materials. Such planar wicks may provide improved capillary flow and increased functional surface area relative to prior braided wicks. As a result, such planar wicks can burn efficiently in a candle without producing undesirable smoke and carbon heading. Further, such planar wicks can create a stable and uniform wax pool diameter. By virtue of the materials and shapes of such planar wicks, the physical shape of a flame may be different than in candles using prior braided wicks. Also, such planar wicks offer decorative possibilities not available with prior braided wicks, and may produce sound when burned—for example, a crackling sound like the sound of wood burning in a fireplace. Such planar wicks and candles employing them are described, for example, in U.S. Pat. Nos. 9,410,696, 9,261,275, US D740, 461, U.S. Pat. Nos. 9,039,409, 8,961,171, US D705,459, US D678,558, U.S. Pat. No. 8,348,662, US D644,360, US D644,359, US D643,554, US 2016/0298837, US 2012/0225392, US 2011/0027737, US 2011/0027736, US 2011/0027735, US 2011/0024945, US 2005/0037308, and US 2004/0009447. The disclosures of each of the foregoing patents and patent application publications are incorporated herein by reference in their entireties.

A subsequent variation on such planar wicks is a wooden wick including a strip of wood, a booster member, which may also be made of wood, and a means for adhering the booster member to such strip of wood. Such wooden wicks and candles employing them are described, for example, in U.S. Pat. Nos. 9,796,946, 9,388,365, 9,120,995, US D715, 989, US D708,777, U.S. Pat. No. 8,708,694, US D669,615, US D663,450, US 2016/0272923, US 2015/0322379, US 2012/0064467, and US 2008/0153046. The disclosures of each of the foregoing patents and patent application publications are incorporated herein by reference in their entireties.

A further variation on planar wicks is a wooden wick including a strip of wood, a booster member, which may also be made of wood, and a means for adhering the booster member to such strip of wood, wherein at least one of the strip of wood and booster is composed of wood having a figured grain. Such wooden wicks and candles employing them are described, for example, in U.S. Pat. No. 9,816,053 and US 2016/0281031. The disclosures of the foregoing patent and patent application publication are incorporated herein by reference in their entireties.

A still further variation on planar wicks is a wood wick including a planar body, wherein shavings are adhered to at least one side of the planar body. Such wooden wicks and candles employing them are described, for example, in US 2016/0272922. The disclosure of the foregoing patent application publication is incorporated herein by reference in its entirety.

While the foregoing planar wicks and subsequent variations represent a leap forward in design relative to the preceding braided wicks, there remains a need for improvements in safety, performance, and aesthetic characteristics of candle wicks and candles employing such wicks.

In view of the foregoing, an object of the present disclosure is to provide wicks for use in candles and other lighting devices, candles and other lighting devices employing such wicks, and methods of preparing such wicks, candles, and other lighting devices, with advantageous properties.

BRIEF SUMMARY OF THE DISCLOSURE

According to a first aspect, the present disclosure relates to a wick comprising a sheet of wick material. The sheet of wick material has height, a width, and a thickness. The height is greater than or equal to the width, and the width is greater than the thickness. The width varies along the height of the wick and/or the height varies along the width of the wick.

In the wick of the first aspect, together with any of the foregoing or following features of the first aspect, the sheet of wick material may comprise a cut out in a surface defined by the height and width.

In the wick of the first aspect, together with any of the foregoing or following features of the first aspect, the cut out may be enclosed by wick material.

In the wick of the first aspect, together with any of the foregoing or following features of the first aspect, the cut out may open at an upper edge of the wick.

In the wick of the first aspect, together with any of the foregoing or following features of the first aspect, the width may vary along the height of the wick, and the width may continuously increase along the height of the wick.

In the wick of the first aspect, together with any of the foregoing or following features of the first aspect, the width may vary along the height of the wick, and the width may increase and then decrease along the height of the wick.

In the wick of the first aspect, together with any of the foregoing or following features of the first aspect, the width may vary along the height of the wick, and the width may decrease and then increase along the height of the wick.

The present disclosure also relates to a method of preparing any wick of the first aspect, comprising die cutting a precursor sheet of wick material.

The present disclosure also relates to a method of preparing any wick of the first aspect, comprising laser cutting a precursor sheet of wick material.

The present disclosure also relates to a candle, comprising a body of meltable candle fuel, and any wick of the first aspect provided in the body of meltable candle fuel.

The present disclosure also relates to a candle, comprising a body of meltable candle fuel, and any wick of the first aspect provided in the body of meltable candle fuel. The width may vary along the height of the wick corresponding to variations in the width of the body of meltable candle fuel.

According to a second aspect, the present disclosure relates to a wick, comprising a sheet of wick material. The sheet of wick material has a height, a width, and a thickness. The height is greater than or equal to the width, and the width is greater than the thickness. The sheet of wick material comprises a plurality of cut outs enclosed by wick material.

In the wick of the second aspect, together with any of the foregoing or following features of the second aspect, the plurality of cut outs may be arranged substantially uniformly over a surface defined by the height and width.

In the wick of the second aspect, together with any of the foregoing or following features of the second aspect, the plurality of cut outs may form a lattice over the surface defined by the height and width.

In the wick of the second aspect, together with any of the foregoing or following features of the second aspect, the plurality of cut outs may be arranged irregularly over a surface defined by the height and width.

The present disclosure also relates to a method of preparing any wick of the second aspect, comprising die cutting a precursor sheet of wick material.

The present disclosure also relates to a method of preparing any wick of the second aspect, comprising laser cutting a precursor sheet of wick material.

The present disclosure also relates to a candle, comprising a body of meltable candle fuel, and any wick of the second aspect provided in the body of meltable candle fuel.

According to a third aspect, the present disclosure relates to a wick, comprising a sheet of a wick material, and a colorant adhered to the at least a portion of the wick.

In the wick of the third aspect, together with any of the foregoing or following features of the third aspect, at least a portion of the colorant may be released from the wick when contacted with a molten candle fuel.

In the wick of the third aspect, together with any of the foregoing or following features of the third aspect, the coating may remain fast when contacted with a molten candle fuel.

In the wick of the third aspect, together with any of the foregoing or following features of the third aspect, the colorant may produce a colored flame when combusted.

In the wick of the third aspect, together with any of the foregoing or following features of the third aspect, the colorant may comprises at least one of cupric chloride, lithium chloride, strontium chloride, copper sulfate, sodium borate, calcium chloride, potassium chloride, sodium chloride, sodium carbonate, magnesium, and iron filings.

The present disclosure also relates to a candle, comprising a body of meltable candle fuel, and any wick of the third aspect provided in the body of meltable candle fuel.

The present disclosure also relates to a candle, comprising a body of meltable candle fuel, and any wick of the third aspect provided in the body of meltable candle fuel. When the candle is lit, a portion of the meltable candle fuel melts to form a pool of candle fuel. When the pool of candle fuel contacts the colorant, the colorant is released into and changes the color of the pool of candle fuel.

The present disclosure also relates to a candle, comprising a body of meltable candle fuel, and any wick of the third aspect provided in the body of meltable candle fuel. When the candle is lit, the colorant combusts to produce a colored flame.

According to a fourth aspect, the present disclosure relates to a wick, comprising a sheet of wick material, and printed subject matter on at least one surface of the wick material. The printed subject matter is formed by engraving the sheet of wick material.

In the wick of the fourth aspect, together with any of the foregoing or following features of the fourth aspect, engraving the sheet of wick material may comprise laser engraving the sheet of wick material.

In the wick of the fourth aspect, together with any of the foregoing or following features of the fourth aspect, the wick has a height, a width, and a thickness, the height is greater than the width, and the width is greater than the thickness, and the printed subject matter may be provided only on surfaces of the wick located within height/4 of the top of the wick.

In the wick of the fourth aspect, together with any of the foregoing or following features of the fourth aspect, the wick has a height, a width, and a thickness, the height is greater than the width, and the width is greater than the thickness, and the printed subject matter may be provided on a surface of the wick located within height/4 of the top of the wick and a surface with height/4 of the top of the wick.

The present disclosure also relates to a candle, comprising a body of meltable candle fuel, and any wick of the fourth aspect provided in the body of meltable candle fuel.

The present disclosure also relates to a candle, comprising a body of meltable candle fuel, and any wick of the fourth aspect provided in the body of meltable candle fuel. At least a portion of the printed subject matter is provided on a surface of the wick below the top surface of the meltable candle fuel, and the printed subject matter is visible when the candle is lit and a portion of the meltable candle fuel melts to form a pool of candle fuel.

According to a fifth aspect, the present disclosure relates to a wick, comprising a sheet of wick material. The sheet of wick material is rolled into a substantially cylindrical shape, and the sheet of wick material is rolled so that a major proportion of a circumference of the cylinder comprises at least two plies of the sheet of wick material.

In the wick of the fifth aspect, together with any of the foregoing or following features of the fifth aspect, the sheet of wick material may have a thickness of from 0.005 to 0.03 inches, and preferably 0.02 to 0.03 inches.

In the wick of the fifth aspect, together with any of the foregoing or following features of the fifth aspect, a length of the sheet in the rolling direction, if unrolled, may be 15 to 75 mm and more preferably 25 to 50 mm.

The present disclosure also relates to a candle, comprising a body of meltable candle fuel, and any wick of the fifth aspect provided in the body of meltable candle fuel.

According to a sixth aspect, the present disclosure relates to a wick, comprising a sheet of a wick material. The sheet of wick material is helically rolled into a substantially cylindrical shape.

The present disclosure also relates to a candle, comprising a body of meltable candle fuel, and any wick of the sixth aspect provided in the body of meltable candle fuel.

The present disclosure also relates to a method of preparing any wick of the sixth aspect, comprising wetting a sheet of a wick material, rolling the sheet of wick material into a substantially cylindrical shape, and drying the rolled sheet of wick material. Rolling the sheet of wick material may comprise rolling the wick material around a cylindrical object. Drying the rolled sheet may comprise storing the rolled sheet of wick material in a tube.

According to a seventh aspect, the present disclosure relates to a wick, comprising: a sheet of wick material; wherein: the wick has a height dimension, a width dimension, and a thickness dimension; the height dimension and the width dimension are greater than the thickness dimension; the height dimension extends from the top of the wick to the bottom of the wick as the wick is oriented when provided in a candle; the width dimension and the thickness dimension are perpendicular to the height dimension; the sheet of wick material comprises at least one cut out portion where no wick material present; and the at least one cut out portion is arranged in the wick material so that the wick material is discontinuous in the width dimension at at least one location in the height dimension.

In the wick of the seventh aspect, together with any of the foregoing or following features of the seventh aspect, the wick material comprises wood.

In the wick of the seventh aspect, together with any of the foregoing or following features of the seventh aspect, the wick material comprises at least one of cotton, cellulose, hemicellulose, lignin, hemp fiber, coir, flax, and protein fiber.

In the wick of the seventh aspect, together with any of the foregoing or following features of the seventh aspect, the wick material comprises at least two separate layers of material adhered to one another.

In the wick of the seventh aspect, together with any of the foregoing or following features of the seventh aspect, the wick comprises two or more cut out portions.

The present disclosure also relates to a candle, comprising a body of meltable candle fuel, and any wick of the seventh aspect provided in the body of meltable candle fuel.

In the wick of the seventh aspect, together with any of the foregoing or following features of the seventh aspect, the at least one cut out portion is formed by die cutting a precursor sheet of wick material.

In the wick of the seventh aspect, together with any of the foregoing or following features of the seventh aspect, the at least one cut out portion is formed by laser cutting a precursor sheet of wick material.

In the wick of the seventh aspect, together with any of the foregoing or following features of the seventh aspect, the at least one cut out portion is enclosed by wick material.

In the wick of the seventh aspect, together with any of the foregoing or following features of the seventh aspect, the wick comprises a top portion, a middle portion, and a bottom portion extending from the top of the wick to the bottom of the wick in the height dimension; the wick material is continuous in the width dimension in the top portion; the wick material is discontinuous in the width dimension in the middle portion; the wick material is continuous in the width dimension in the bottom portion; and when the wick is provided in a candle and burnt, the wick appears as a single planar wick when the top portion is burning, the wick appears a two planar wicks when the middle portion is burning, and the wick appears as a single planar wick when the bottom portion is burning.

In the wick of the seventh aspect, together with any of the foregoing or following features of the seventh aspect, the wick material has a width of 0.5 to 2 inches in the top portion; each continuous segment of the wick material in the width dimension in the middle portion has a width of 0.375 to 1 inches; the wick material has a width of 0.5 to 2 inches in the bottom portion; and the wick material has a thickness of 0.005 to 0.125 inches.

The present disclosure also relates to a candle including any wick of the seventh aspect, wherein the candle has a top portion, a middle portion, and a bottom portion in a height dimension corresponding to the top portion, the middle portion, and the bottom portion of the wick as provided in the candle; the candle has a width of 2.5 to 6 inches in the top portion; the candle has a width of 3 to 8 inches in the middle portion; and the candle has a width of 2.5 to 6 inches in the bottom portion.

In the wick of the seventh aspect, together with any of the foregoing or following features of the seventh aspect, the at least one cut out portion opens at an upper edge of the wick.

In the wick of the seventh aspect, together with any of the foregoing or following features of the seventh aspect, the wick comprises a top portion and a bottom portion extending from the top of the wick to the bottom of the wick in the height dimension; the wick material is discontinuous in the width dimension in the top portion; the wick material is continuous in the width dimension in the bottom portion; and when the wick is provided in a candle and burnt, the wick appears as two planar wicks when the top portion is burning, and the wick appears as a single planar wick when the bottom portion is burning.

In the wick of the seventh aspect, together with any of the foregoing or following features of the seventh aspect, each continuous segment of the wick material in the width dimension in the top portion has a width of 0.25 to 1.5 inches; the wick material has a width of 0.375 to 3 inches in the bottom portion; and the wick material has a thickness of 0.005 to 0.125 inches.

The present disclosure also relates to a candle including any wick of the seventh aspect, wherein the candle has a top portion and a bottom portion corresponding to the top portion and the bottom portion of the wick as provided in the candle; the candle has a width of 2.5 to 6 inches in the top portion; and the candle has a width of 2 to 5 inches in the bottom portion.

In the wick of the seventh aspect, together with any of the foregoing or following features of the seventh aspect, the wick material is dyed.

In the wick of the seventh aspect, together with any of the foregoing or following features of the seventh aspect, the wick comprises printed subject matter provided on at least one surface of the wick material, printed subject matter being provided on substantially the entirety of the at least one surface.

According to an eighth aspect, the present disclosure relates to a wick, comprising: a sheet of wick material; wherein: the sheet of wick material has a height dimension, a width dimension, and a thickness dimension; the height dimension and the width dimension are greater than the thickness dimension; the height dimension extends from the top of sheet of wick material to the bottom of sheet of wick material as sheet of wick material is oriented when provided in a candle; the width dimension and the thickness dimension are perpendicular to the height dimension; at least a portion of the sheet of wick material is dyed; and the dyed portion of the sheet of wick material is color fast or treated so that the dye does not bleed into a body of meltable fuel of a candle when the wick is provided in the candle.

In the wick of the eighth aspect, together with any of the foregoing or following features of the eighth aspect, the sheet of wick material is formed to have at least one of a curved, round, spiral, alphanumeric, cross, and X shape, when viewed from above.

In the wick of the eighth aspect, together with any of the foregoing or following features of the eighth aspect, the dyed portion of the sheet of wick material is configured to alter the rate at which molten fuel can be transported through the wick.

In the wick of the eighth aspect, together with any of the foregoing or following features of the eighth aspect, the sheet of wick material comprises at least one opening extending through the wick material in the thickness dimension.

In the wick of the eighth aspect, together with any of the foregoing or following features of the eighth aspect, the wick comprises at least two sheets of wick material.

In the wick of the eighth aspect, together with any of the foregoing or following features of the eighth aspect, at least one of the sheets of wick material is fibrous.

In the wick of the eighth aspect, together with any of the foregoing or following features of the eighth aspect, at least two portions of the sheet of wick material are dyed in different colors.

In the wick of the eighth aspect, together with any of the foregoing or following features of the eighth aspect, the at least two portions of the sheet of wick material dyed in different colors are provided at different locations on the wick material in the height dimension.

The present disclosure also relates to a candle, comprising any wick of the eighth aspect and a meltable fuel, wherein, when the candle is burnt, the meltable fuel liquefies and becomes translucent revealing the two portions of the sheet of wick material dyed in different colors in sequence.

In the wick of the eighth aspect, together with any of the foregoing or following features of the eighth aspect, the sheet of wick material is treated with a substance that causes a flame to change color when the wick is lit.

In the wick of the eighth aspect, together with any of the foregoing or following features of the eighth aspect, a visible pattern is formed on at least one surface of the sheet of wick material.

In the wick of the eighth aspect, together with any of the foregoing or following features of the eighth aspect, the visible pattern is formed by at least one of printing, laser-cutting, laser etching, stamping, and engraving.

In the wick of the eighth aspect, together with any of the foregoing or following features of the eighth aspect, the visible pattern comprises at least one of a word, an image, and an ornamental design.

In the wick of the eighth aspect, together with any of the foregoing or following features of the eighth aspect, the visible pattern is configured to alter the rate at which molten fuel can be transported through the wick.

The present disclosure also relates to a candle, comprising any wick of the eighth aspect and a meltable fuel, wherein, when the candle is burnt, the meltable fuel liquefies to reveal a dyed portion of the sheet of wick material that was not visible prior to burning.

The present disclosure also relates to a candle, comprising any wick of the eighth aspect and a meltable fuel.

The present disclosure also relates to a candle, comprising any wick of the eighth aspect and a meltable fuel, wherein, when the candle is burnt, the meltable fuel liquefies to reveal at least a portion of the visible pattern that was not visible prior to burning.

According to a ninth aspect, the present disclosure relates to a wick, comprising: a sheet of wick material; wherein: the sheet of wick material has a height dimension, a width dimension, and a thickness dimension; the height dimension and the width dimension are greater than the thickness dimension; the height dimension extends from the top of sheet of wick material to the bottom of sheet of wick material as sheet of wick material is oriented when provided in a candle; the width dimension and the thickness dimension are perpendicular to the height dimension; at least a portion of the sheet of wick material is dyed; and the dyed portion of the sheet of wick material is not color fast so that the dye bleeds into a body of meltable fuel of a candle when the wick during manufacture of the candle or during use of the candle.

In the wick of the ninth aspect, together with any of the foregoing or following features of the ninth aspect, the sheet of wick material is formed to have at least one of a curved, round, spiral, alphanumeric, cross, and X shape, when viewed from above.

In the wick of the ninth aspect, together with any of the foregoing or following features of the ninth aspect, the dyed portion of the sheet of wick material is configured to alter the rate at which molten fuel can be transported through the wick.

In the wick of the ninth aspect, together with any of the foregoing or following features of the ninth aspect, the sheet of wick material comprises at least one opening extending through the wick material in the thickness dimension.

In the wick of the ninth aspect, together with any of the foregoing or following features of the ninth aspect, the wick comprises at least two sheets of wick material.

In the wick of the ninth aspect, together with any of the foregoing or following features of the ninth aspect, at least one of the sheets of wick material is fibrous.

In the wick of the ninth aspect, together with any of the foregoing or following features of the ninth aspect, at least two portions of the sheet of wick material are dyed in different colors.

In the wick of the ninth aspect, together with any of the foregoing or following features of the ninth aspect, the at least two portions of the sheet of wick material dyed in different colors are provided at different locations on the wick material in the height dimension.

The present disclosure also relates to a candle, comprising any wick of the ninth aspect and a meltable fuel, wherein, when the candle is burnt, the meltable fuel liquefies and takes on the color of the two portions of the sheet of wick material dyed in different colors in sequence.

In the wick of the ninth aspect, together with any of the foregoing or following features of the ninth aspect, the sheet of wick material is treated with a substance that causes a flame to change color when the wick is lit.

In the wick of the ninth aspect, together with any of the foregoing or following features of the ninth aspect, a visible pattern is formed on at least one surface of the sheet of wick material.

In the wick of the ninth aspect, together with any of the foregoing or following features of the ninth aspect, the visible pattern is formed by at least one of printing, laser-cutting, laser etching, stamping, and engraving.

In the wick of the ninth aspect, together with any of the foregoing or following features of the ninth aspect, the visible pattern comprises at least one of a word, an image, and an ornamental design.

In the wick of the ninth aspect, together with any of the foregoing or following features of the ninth aspect, the visible pattern is configured to alter the rate at which molten fuel can be transported through the wick.

The present disclosure also relates to a candle, comprising any wick of the ninth aspect and a meltable fuel, wherein, when the candle is burnt, the meltable fuel liquefies to reveal at least a portion of the visible pattern that was not visible prior to burning.

The present disclosure also relates to a candle, comprising any wick of the ninth aspect and a meltable fuel.

According to a tenth aspect, the present disclosure relates to a wick, comprising: a sheet of wick material; wherein: the sheet of wick material has a height dimension, a width dimension, and a thickness dimension; the height dimension and the width dimension are greater than the thickness dimension; the height dimension extends from the top of sheet of wick material to the bottom of sheet of wick material as sheet of wick material is oriented when provided in a candle; the width dimension and the thickness dimension are perpendicular to the height dimension; and a visible pattern is formed on at least one surface of the sheet of wick material.

In the wick of the tenth aspect, together with any of the foregoing or following features of the tenth aspect, a visible pattern is formed on both sides of the sheet of wick material.

In the wick of the tenth aspect, together with any of the foregoing or following features of the tenth aspect, the sheet of wick material is formed to have at least one of a curved, round, spiral, alphanumeric, cross, and X shape, when viewed from above.

In the wick of the tenth aspect, together with any of the foregoing or following features of the tenth aspect, the visible pattern is formed by at least one of printing, laser-cutting, laser etching, stamping, and engraving.

In the wick of the tenth aspect, together with any of the foregoing or following features of the tenth aspect, the visible pattern comprises at least one of a word, an image, and an ornamental design.

In the wick of the tenth aspect, together with any of the foregoing or following features of the tenth aspect, the wick comprises at least two sheets of wick material.

In the wick of the tenth aspect, together with any of the foregoing or following features of the tenth aspect, at least one of the sheets of wick material is fibrous.

In the wick of the tenth aspect, together with any of the foregoing or following features of the tenth aspect, the visible pattern is configured to alter the rate at which molten fuel can be transported through the wick.

The present disclosure also relates to a candle, comprising any wick of the tenth aspect and a meltable fuel.

The present disclosure also relates to a candle, comprising any wick of the tenth aspect and a meltable fuel, wherein, when the candle is burnt, the meltable fuel liquefies to reveal at least a portion of the visible pattern that was not visible prior to burning.

According to an eleventh aspect, the present disclosure relates to a wick, comprising: a sheet of wick material; and a fibrous image layer; wherein: each of the sheet of wick material and the fibrous image layer has a height dimension, a width dimension, and a thickness dimension; the height dimension and the width dimension are greater than the thickness dimension; the height dimension extends from the top of the wick to the bottom of the wick as the wick is oriented when provided in a candle; the width dimension and the thickness dimension are perpendicular to the height dimension; the sheet of wick material and the fibrous image layer are adhered to one another; and a visible pattern is formed on at least one surface of the sheet of the fibrous image layer.

In the wick of the eleventh aspect, together with any of the foregoing or following features of the eleventh aspect, a visible pattern is formed on both sides of the fibrous image layer.

In the wick of the eleventh aspect, together with any of the foregoing or following features of the eleventh aspect, the sheet of wick material and the fibrous image layer are formed to have at least one of a curved, round, spiral, alphanumeric, cross, and X shape, when viewed from above.

In the wick of the eleventh aspect, together with any of the foregoing or following features of the eleventh aspect, the visible pattern comprises at least one of a word, an image, and an ornamental design.

In the wick of the eleventh aspect, together with any of the foregoing or following features of the eleventh aspect, the visible pattern is formed by printing a photograph onto the fibrous image layer.

In the wick of the eleventh aspect, together with any of the foregoing or following features of the eleventh aspect, the wick comprises at least two sheets of wick material with the fibrous image layer provided therebetween.

In the wick of the eleventh aspect, together with any of the foregoing or following features of the eleventh aspect, the fibrous image layer extends above the two sheets of wick material in the height dimension.

The present disclosure also relates to a candle, comprising any wick of the eleventh aspect and a meltable fuel.

The present disclosure also relates to a candle, comprising any wick of the eleventh aspect and a meltable fuel, wherein, when the candle is burnt, the meltable fuel liquefies to reveal at least a portion of the visible pattern that was not visible prior to burning.

According to a twelfth aspect, the present disclosure relates to a wick, comprising: a sheet of wick material; wherein: the sheet of wick material has a height dimension, a width dimension, and a thickness dimension; the height dimension and the width dimension are greater than the thickness dimension; the height dimension extends from the top of sheet of wick material to the bottom of sheet of wick material as sheet of wick material is oriented when provided in a candle; the width dimension and the thickness dimension are perpendicular to the height dimension; and the sheet of wick material comprises a plurality of openings extending through the wick material in the thickness dimension, the respective openings being enclosed by wick material.

In the wick of the twelfth aspect, together with any of the foregoing or following features of the twelfth aspect, the plurality of cut outs are arranged substantially uniformly over a surface of the sheet of wick material defined by the height and width dimensions.

In the wick of the twelfth aspect, together with any of the foregoing or following features of the twelfth aspect, the plurality of cut outs form a lattice pattern.

In the wick of the twelfth aspect, together with any of the foregoing or following features of the twelfth aspect, the sheet of wick material is formed to have at least one of a curved, round, spiral, alphanumeric, cross, and X shape, when viewed from above.

In the wick of the twelfth aspect, together with any of the foregoing or following features of the twelfth aspect, the plurality of openings are formed by at least one of printing, laser-cutting, laser etching, stamping, and engraving.

In the wick of the twelfth aspect, together with any of the foregoing or following features of the twelfth aspect, the wick comprises at least two sheets of wick material.

In the wick of the twelfth aspect, together with any of the foregoing or following features of the twelfth aspect, at least one of the sheets of wick material is fibrous.

In the wick of the twelfth aspect, together with any of the foregoing or following features of the twelfth aspect, the plurality of openings are configured to alter the rate at which molten fuel can be transported through the wick.

The present disclosure also relates to a candle, comprising any wick of the twelfth aspect and a meltable fuel.

The present disclosure also relates to a candle, comprising any wick of the twelfth aspect and a meltable fuel, wherein, when the candle is burnt, the meltable fuel liquefies to reveal at least some of the plurality of openings that were not visible prior to burning.

The present disclosure also relates to a method of preparing a candle, comprising arranging a wick of any preceding aspect in a container or mold, filling the container or mold with a molten candle fuel so that a portion of the wick remains above an uppermost surface of the molten candle fuel, and cooling the molten candle fuel. Arranging the wick may comprise placing the wick in a sustainer situated in the container or mold.

Arranging the wick may comprise placing the wick in a sustainer and placing the wick and sustainer in the container or mold.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6(d) is a perspective view of an exemplary wick having a first cut out print design according to the present invention shown in the environment of a candle;

FIG. 6(e) is a top view of an exemplary wick having a first cut out print design according to the present invention shown in the environment of a candle;

FIG. 6(f) is a perspective view of an exemplary wick having a second cut out print design according to the present invention shown in the environment of a candle;

FIG. 7(a) is a front view of an exemplary wick having a first cut out lattice design according to the present invention;

FIG. 7(b) is a front view of an exemplary wick having a first cut out lattice design according to the present invention;

FIG. 7(c) is a front view of an exemplary wick having a first cut out lattice design according to the present invention;

FIG. 8(a) is a front view of an exemplary wick having a second cut out lattice design according to the present invention;

FIG. 8(b) is a front view of an exemplary wick having a second cut out lattice design according to the present invention;

FIG. 8(c) is a front view of an exemplary wick having a second cut out lattice design according to the present invention;

FIG. 9(a) is a front view of an exemplary wick having a third cut out lattice design according to the present invention;

FIG. 9(b) is a front view of an exemplary wick having a third cut out lattice design according to the present invention;

FIG. 9(c) is a front view of an exemplary wick having a third cut out lattice design according to the present invention;

FIG. 10(a) is a front view of an exemplary dyed wick having a first color according to the present invention;

FIG. 10(b) is a side view of an exemplary dyed wick having a first color according to the present invention;

FIG. 10(c) is a top view of an exemplary dyed wick having a first color according to the present invention;

FIG. 10(d) is a front view of an exemplary dyed wick having a second color according to the present invention;

FIG. 10(e) is a side view of an exemplary dyed wick having a second color according to the present invention;

FIG. 10(f) is a top view of an exemplary dyed wick having a second color according to the present invention;

FIG. 10(g) is a front view of an exemplary dyed wick having a third color according to the present invention;

FIG. 10(h) is a side view of an exemplary dyed wick having a third color according to the present invention;

FIG. 10(i) is a top view of an exemplary dyed wick having a third color according to the present invention;

FIG. 10(j) is a front view of an exemplary dyed wick having a fourth color according to the present invention;

FIG. 10(k) is a side view of an exemplary dyed wick having a fourth color according to the present invention;

FIG. 10(l) is a top view of an exemplary dyed wick having a fourth color according to the present invention;

FIG. 10(m) is a front view of an exemplary dyed wick having a fifth color according to the present invention;

FIG. 10(n) is a side view of an exemplary dyed wick having a fifth color according to the present invention;

FIG. 10(o) is a top view of an exemplary dyed wick having a fifth color according to the present invention;

FIG. 10(p) is a perspective view of an exemplary dyed wick having a second color according to the present invention shown in the environment of a candle;

FIG. 10(q) is a top view of an exemplary dyed wick having a second color according to the present invention shown in the environment of a candle;

FIG. 10(r) is a perspective view of an exemplary dyed wick having a second color according to the present invention;

FIG. 11(d) is a perspective view of an exemplary wick having a first printed design according to the present invention shown in the environment of a candle;

FIG. 11(e) is a top view of an exemplary wick having a first printed design according to the present invention shown in the environment of a candle;

FIG. 11(f) is a perspective view of an exemplary candle according to the present invention including an exemplary wick having a second printed design according to the present invention;

FIG. 13(*i*) is a perspective view of an exemplary candle according to the present invention including an exemplary wick having a first printed insert according to the present invention;

FIG. 14(*b*) is a top view of an exemplary wick having a first spiral configuration according to the present invention;

FIG. 14(*c*) is a top view of an exemplary wick having a second spiral configuration according to the present invention;

FIG. 14(*d*) is a top view of an exemplary wick having a third spiral configuration according to the present invention;

FIG. 14(*e*) is a top view of an exemplary wick having a fourth spiral configuration according to the present invention;

FIG. 14(*f*) is a perspective view of an exemplary wick having a fourth spiral configuration according to the present invention shown in the environment of a candle; and FIG. 14(*g*) is a top view of an exemplary wick having a fourth spiral configuration according to the present invention shown in the environment of a candle.

DETAILED DESCRIPTION OF THE EMBODIMENTS

Figure 1A:
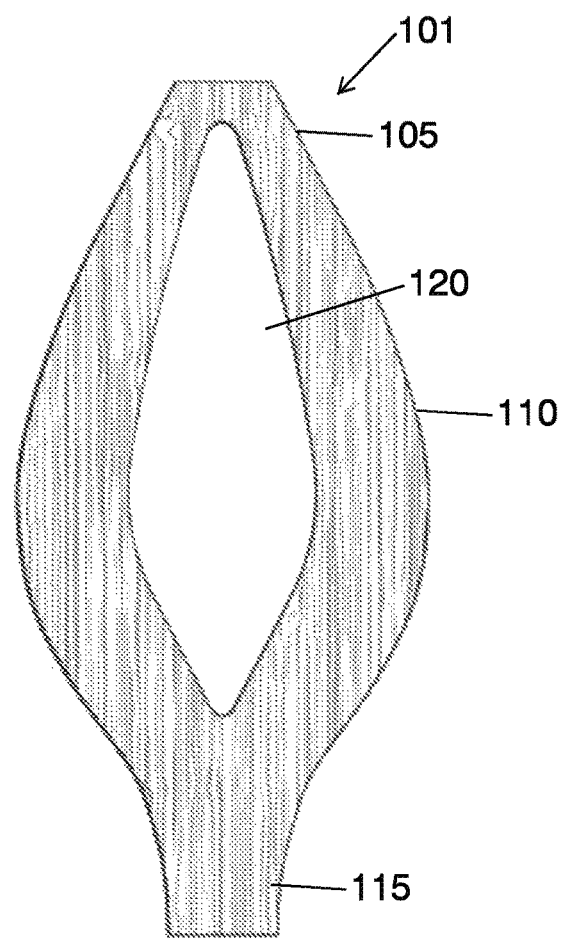
FIG. 1(a) is a front view of an exemplary wick having a closed split configuration according to the present invention.
Figure 1B:
FIG. 1(b) is a side view of an exemplary wick having a closed split configuration according to the present invention.
Figure 1C:
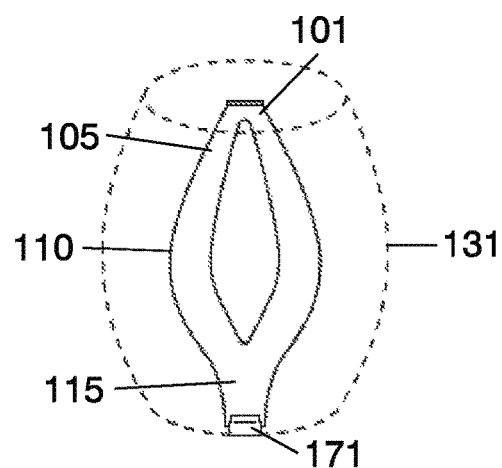
FIG. 1(c) is a perspective view of an exemplary wick having a closed split configuration according to the present invention shown in the environment of a candle.
Figure 1D:
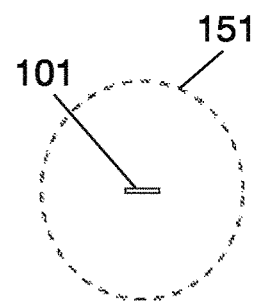
FIG. 1(d) is a top view of an exemplary wick having a closed split configuration according to the present invention shown in the environment of a candle.
Figures 2A, 2B:
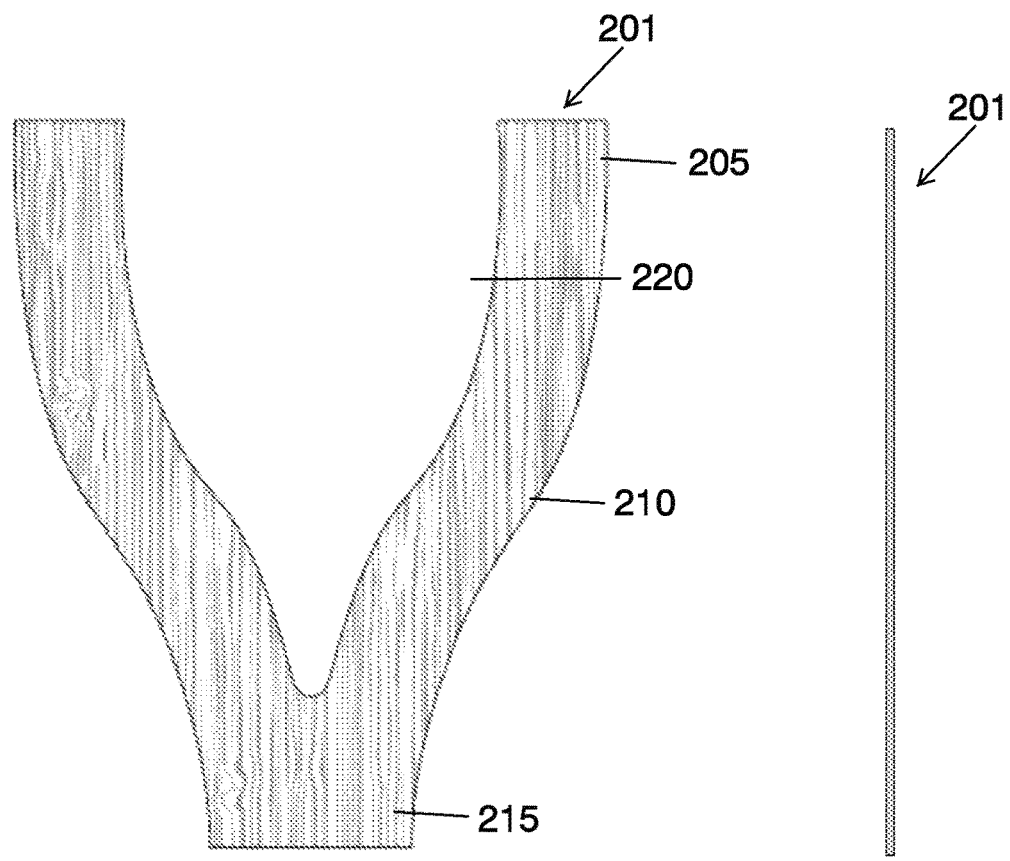
FIG. 2(a) is a front view of an exemplary wick having an open split configuration according to the present invention.
FIG. 2(b) is a side view of an exemplary wick having an open split configuration according to the present invention.
Figures 2C, 2D:
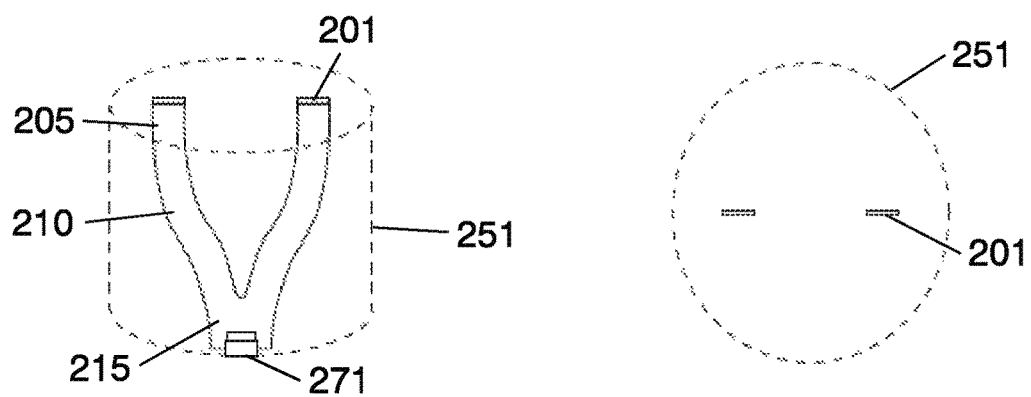
FIG. 2(c) is a perspective view of an exemplary wick having an open split configuration according to the present invention shown in the environment of a candle.
FIG. 2(d) is a top view of an exemplary wick having an open split configuration according to the present invention shown in the environment of a candle.
Figure 3A:
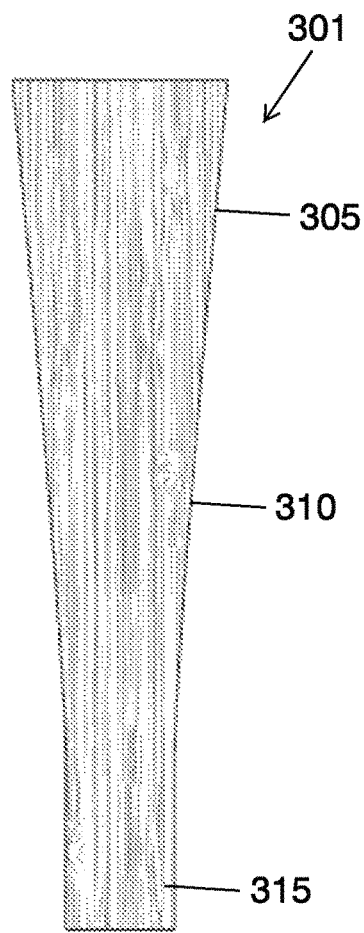
FIG. 3(a) is a front view of an exemplary wick having a first variable width configuration according to the present invention.
Figure 3B:
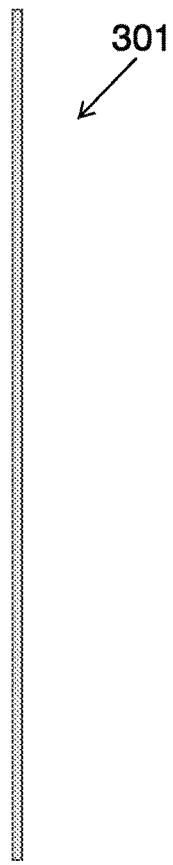
FIG. 3(b) is a side view of an exemplary wick having a first variable width configuration according to the present invention.
Figure 3C:
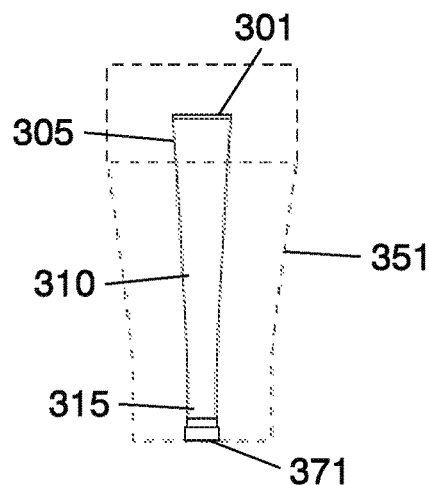
FIG. 3(c) is a perspective view of an exemplary wick having a first variable width configuration according to the present invention shown in the environment of a candle.
Figure 3D:
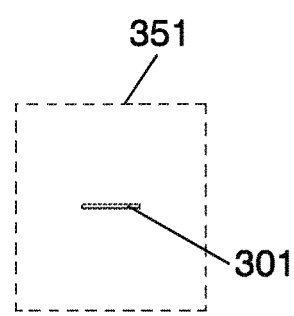
FIG. 3(d) is a top view of an exemplary wick having a first variable width configuration according to the present invention shown in the environment of a candle.
Figure 4A:
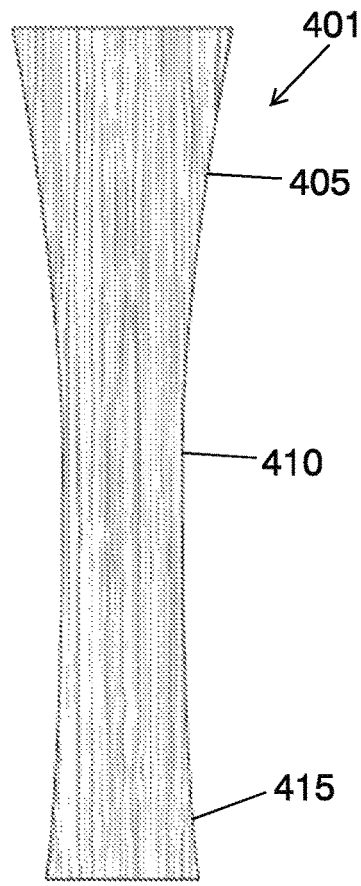
FIG. 4(a) is a front view of an exemplary wick having a second variable width configuration according to the present invention.
Figure 4B:
FIG. 4(b) is a side view of an exemplary wick having a second variable width configuration according to the present invention.
Figure 4C:
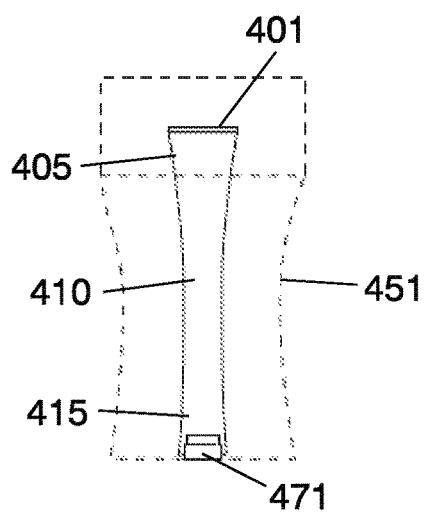
FIG. 4(c) is a perspective view of an exemplary wick having a second variable width configuration according to the present invention shown in the environment of a candle.
Figure 4D:
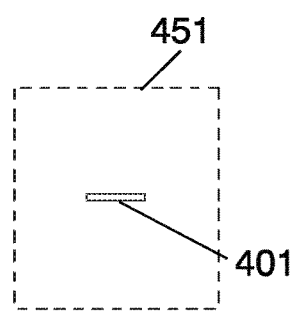
FIG. 4(d) is a top view of an exemplary wick having a second variable width configuration according to the present invention shown in the environment of a candle.
Figures 5A, 5B:
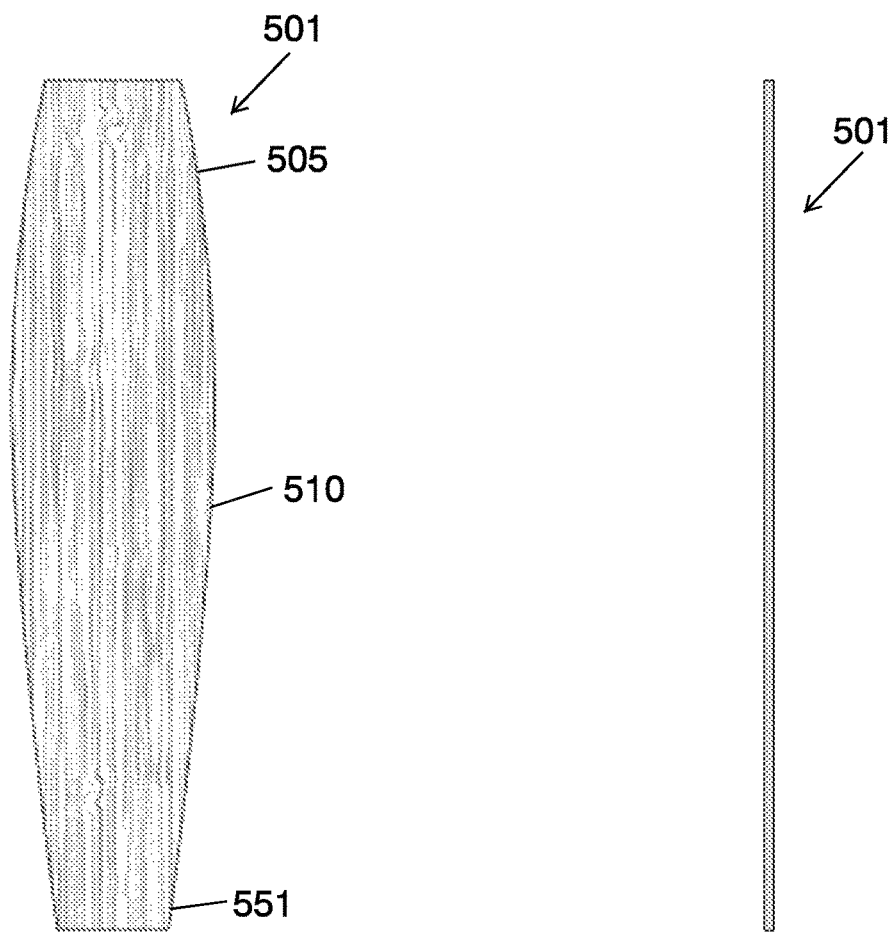
FIG. 5(a) is a front view of an exemplary wick having a third variable width configuration according to the present invention.
FIG. 5(b) is a side view of an exemplary wick having a third variable width configuration according to the present invention.
Figures 5C, 5D:
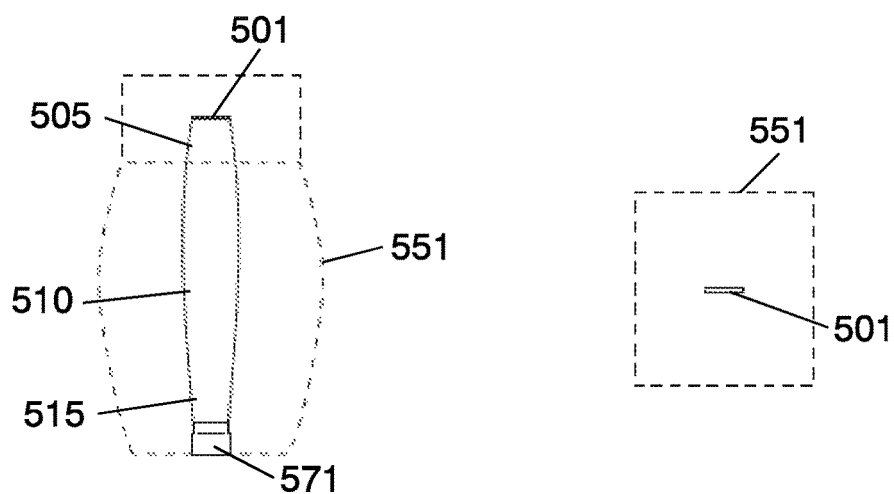
FIG. 5(c) is a perspective view of an exemplary wick having a third variable width configuration according to the present invention shown in the environment of a candle.
FIG. 5(d) is a top view of an exemplary wick having a third variable width configuration according to the present invention shown in the environment of a candle.
Figure 6A:
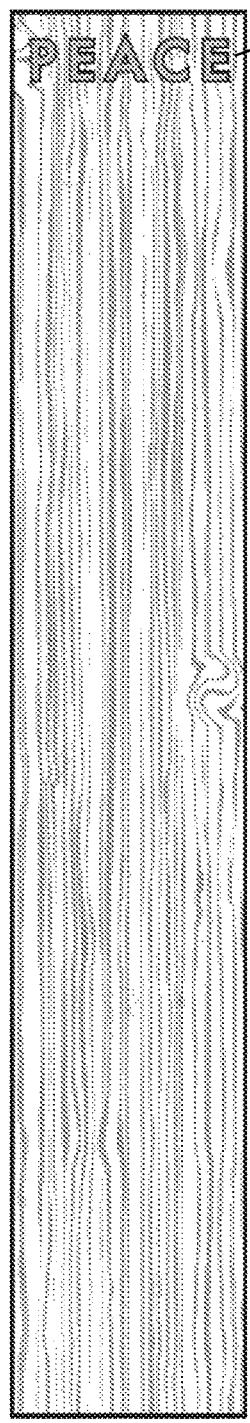
FIG. 6(a) is a front view of an exemplary wick having a first cut out print design according to the present invention.
Figure 6B:
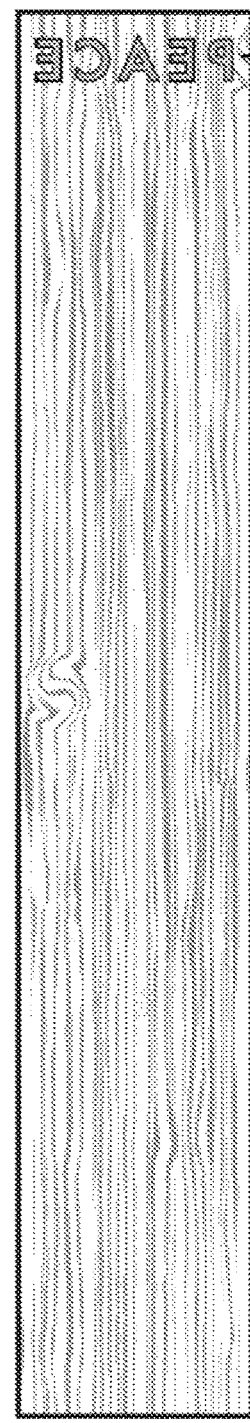
FIG. 6(b) is a back view of an exemplary wick having a first cut out print design according to the present invention.
Figure 6C:
FIG. 6(c) is a side view of an exemplary wick having a first cut out print design according to the present invention.
Figure 7D:
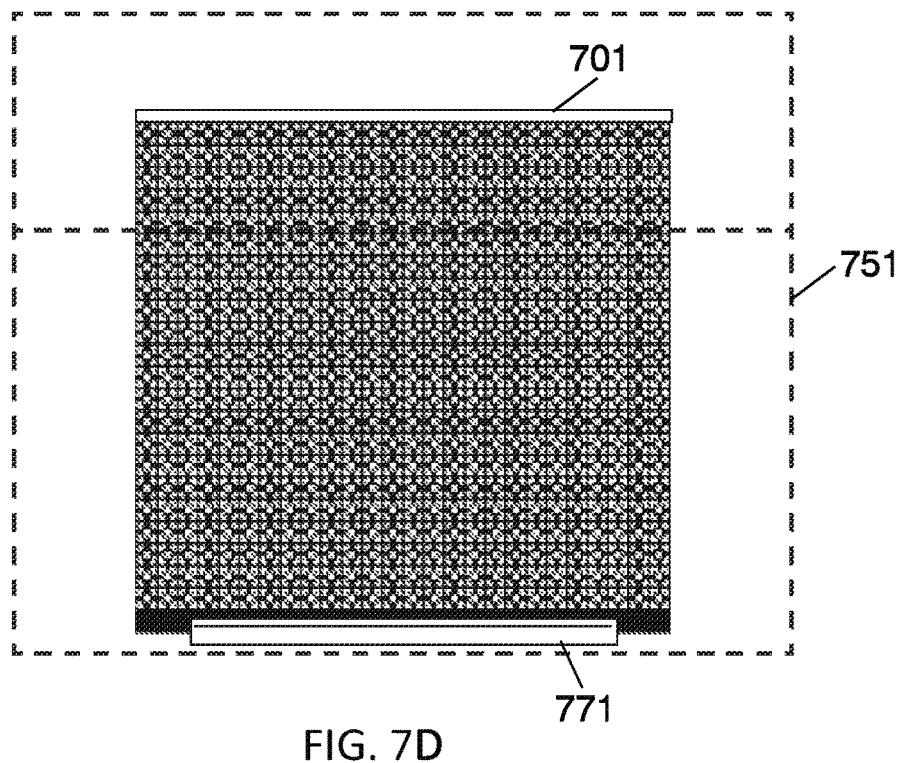
FIG. 7(d) is a perspective view of an exemplary wick having a first cut out lattice design according to the present invention shown in the environment of a candle.
Figure 7E:
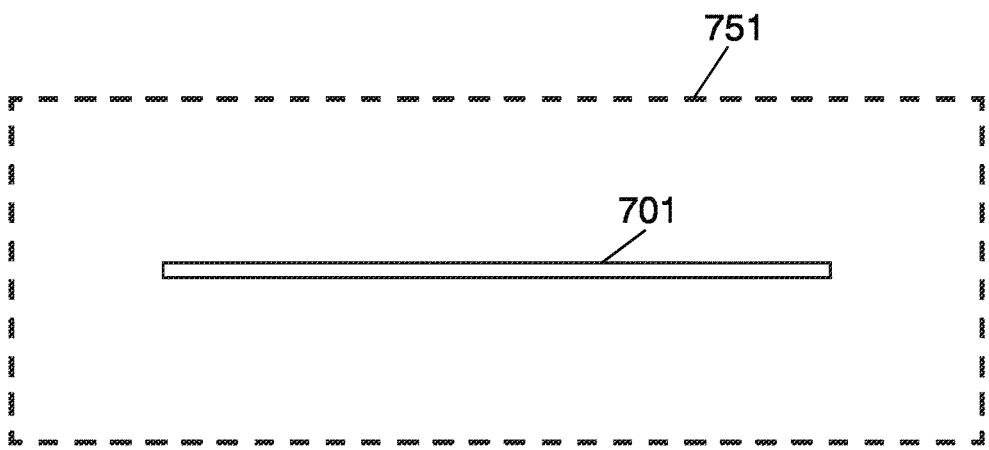
FIG. 7(e) is a top view of an exemplary wick having a first cut out lattice design according to the present invention shown in the environment of a candle.
Figure 8D:
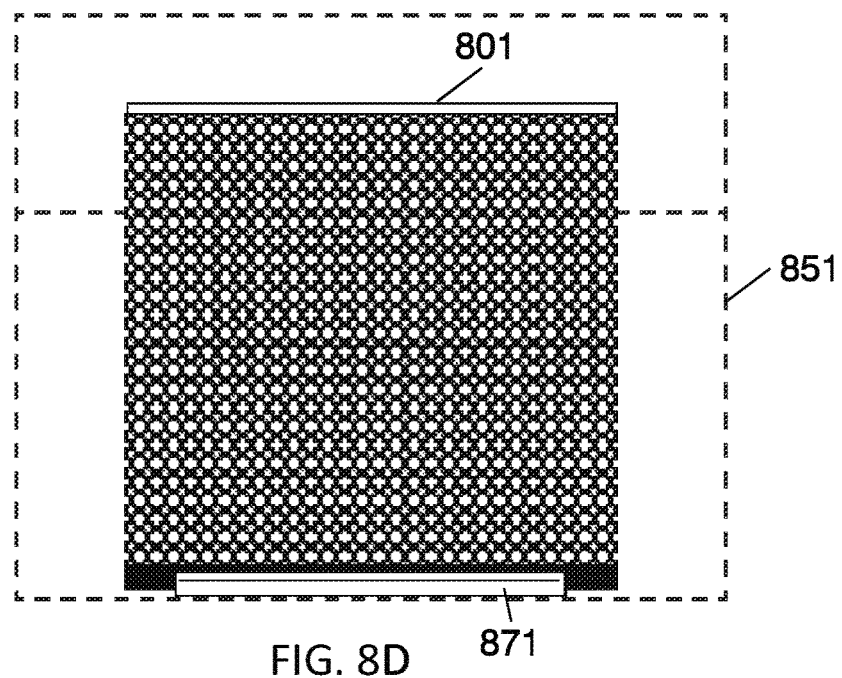
FIG. 8(d) is a perspective view of an exemplary wick having a second cut out lattice design according to the present invention shown in the environment of a candle.
Figure 8E:
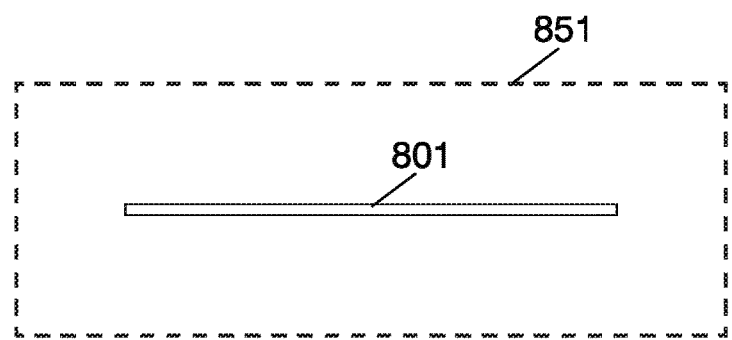
FIG. 8(e) is a top view of an exemplary wick having a second cut out lattice design according to the present invention shown in the environment of a candle.
Figure 9D:
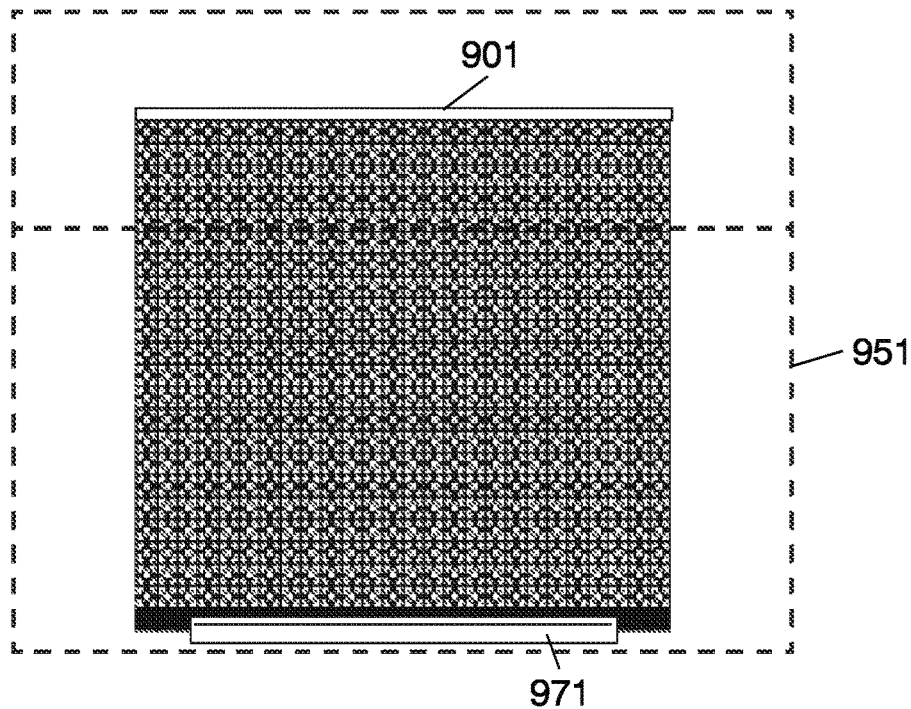
FIG. 9(d) is a perspective view of an exemplary wick having a third cut out lattice design according to the present invention shown in the environment of a candle.
Figure 9E:
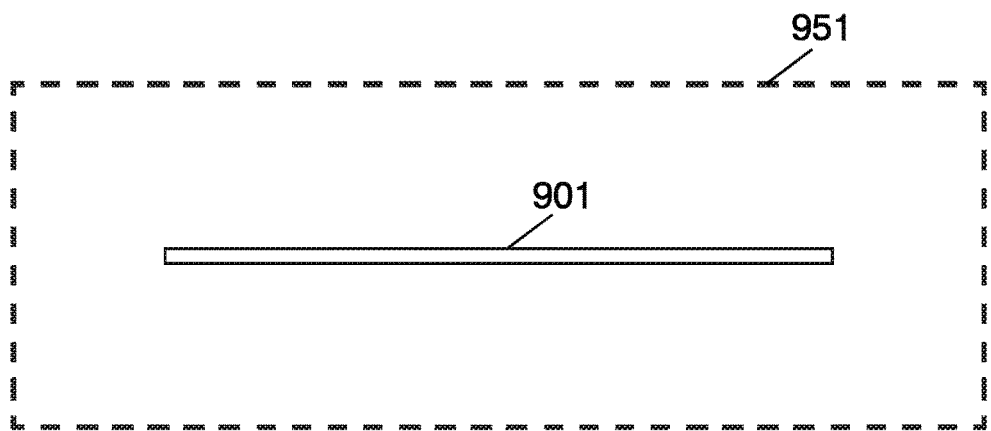
FIG. 9(e) is a top view of an exemplary wick having a third cut out lattice design according to the present invention shown in the environment of a candle.
Figure 11A:
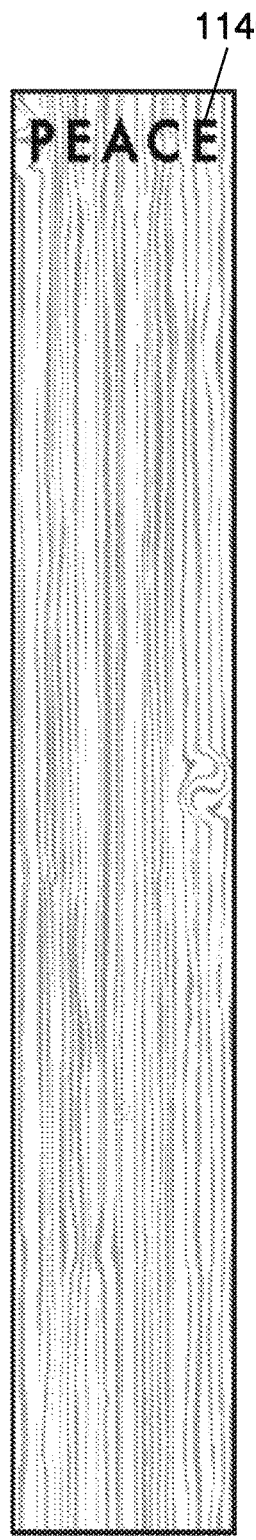
FIG. 11(a) is a front view of an exemplary wick having a first printed design according to the present invention.
Figure 11B:
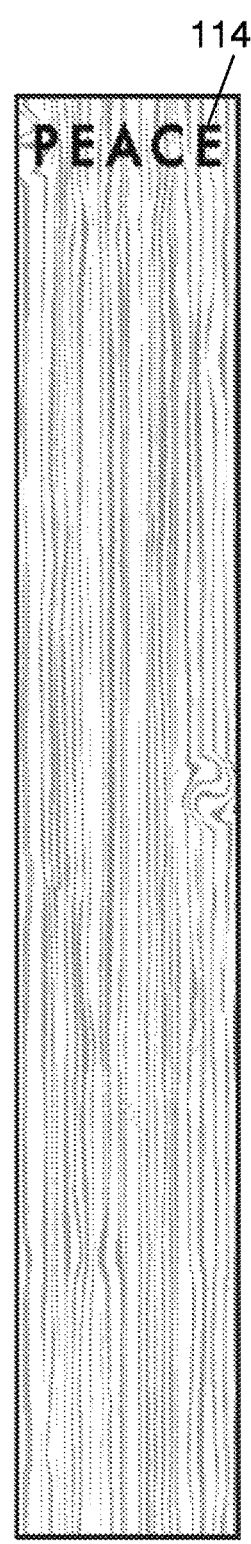
FIG. 11(b) is a back view of an exemplary wick having a first printed design according to the present invention.
Figure 11C:
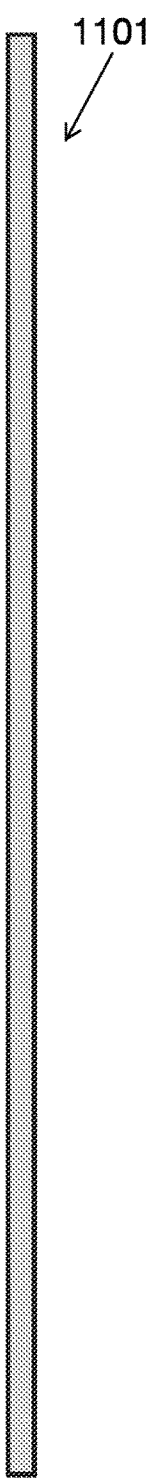
FIG. 11(c) is a side view of an exemplary wick having a first printed design according to the present invention.
Figure 12A:
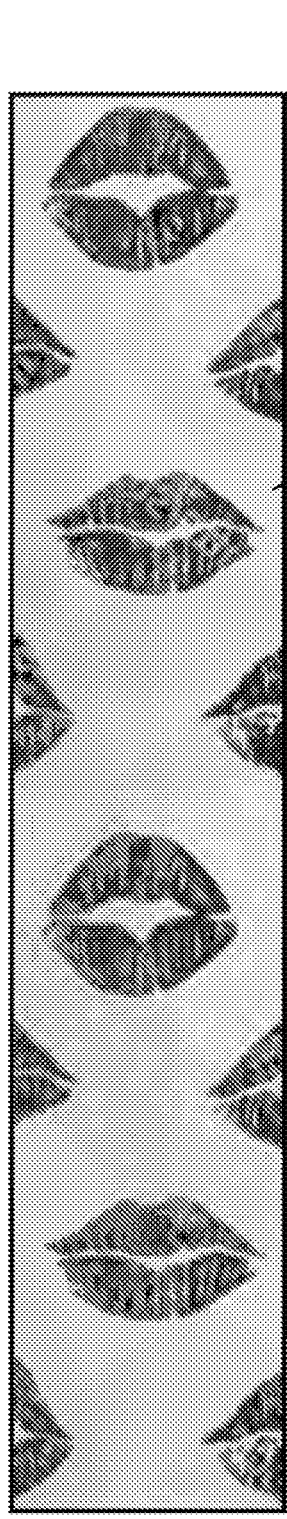
FIG. 12(a) is a front view of an exemplary wick having a first printed surface according to the present invention.
Figure 12B:
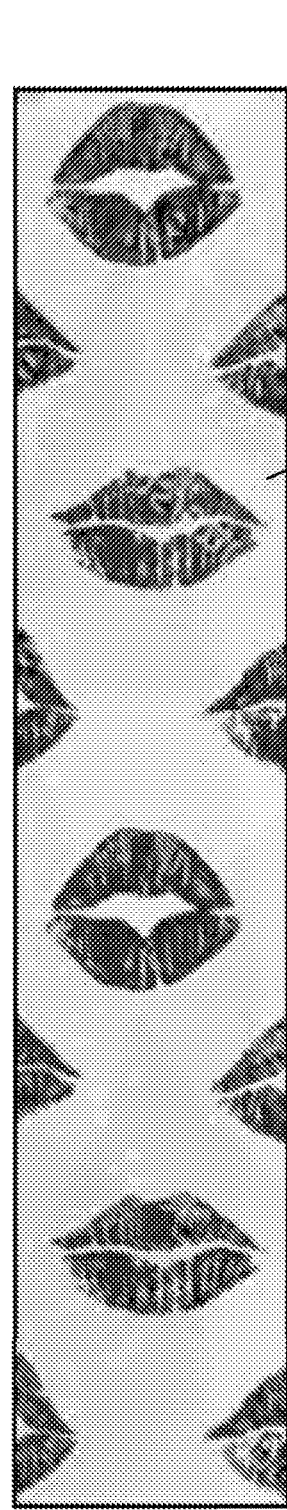
FIG. 12(b) is a back view of an exemplary wick having a first printed surface according to the present invention.
Figure 12C:
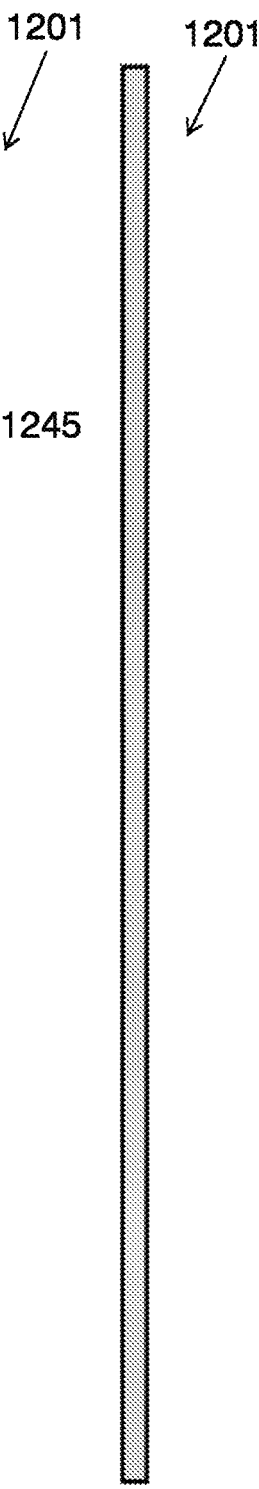
FIG. 12(c) is a side view of an exemplary wick having a first printed surface according to the present invention.
Figure 12D:
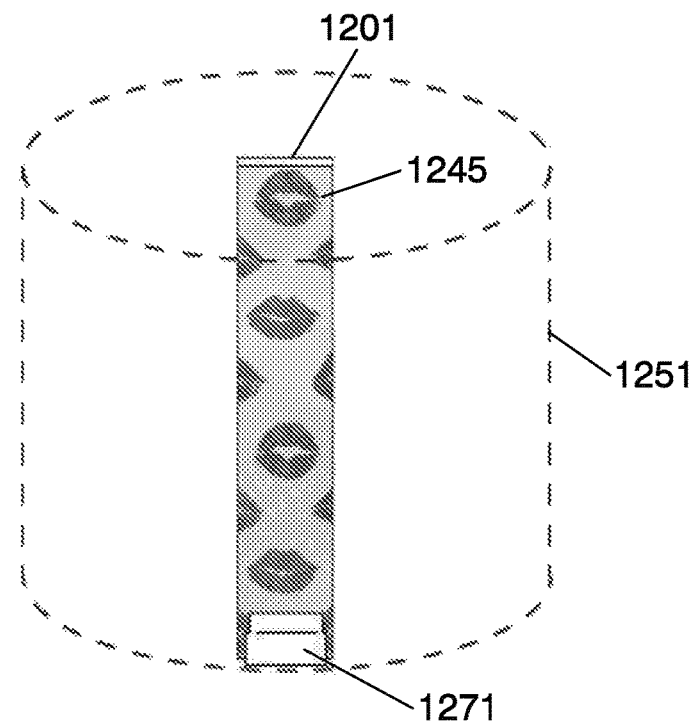
FIG. 12(d) is a perspective view of an exemplary wick having a first printed surface according to the present invention shown in the environment of a candle.
Figure 12E:
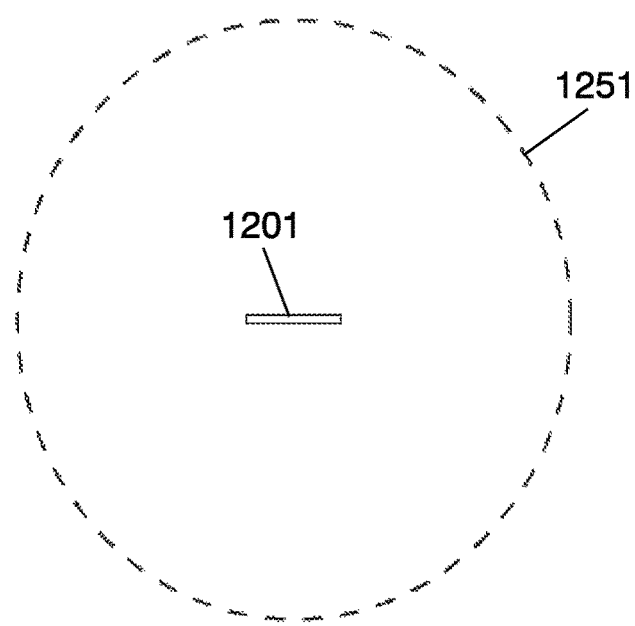
FIG. 12(e) is a top view of an exemplary wick having a first printed surface according to the present invention shown in the environment of a candle.

Embodiments of the present disclosure will now be described more fully hereinafter with reference to the accompanying drawings, in which some, but not all of the embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range, including subranges excluding endpoints, are specifically included as if explicitly written out.

As used herein, the terms "optional" or "optionally" means that the subsequently described event(s) can or cannot occur or the subsequently described component(s) may or may not be present (e.g., 0 wt %).

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the wick, candle, or other lighting device. Basic and novel properties of the present disclosure include the capability of producing a safe, sustained flame when a wick is lit in a candle or other lighting device. The term "consisting of" describes aspects of the invention in which only those features explicitly recited in the claims are included and thus other components not explicitly or inherently included in the claim are excluded.

The following discussion is made with reference to wicks and candles including such wicks. However, the wicks of the present application may also be used in other lighting devices, particularly in lanterns or lamps using a fuel that is liquid rather than solid at room temperature. In such embodiments, the composition and structure of the wicks described below may be modified to ensure that a safe, sustained flame is obtained when the wick is lit.

In various exemplary embodiments, the present disclosure relates to wicks for use in candles, candles employing such wicks, and methods of preparing such wicks and candles.

It is expressly intended that the features of the various wicks and candles described herein be interchangeably used and used in combination. That is, to the extent that a material, structure, and/or size is mentioned with respect to an embodiment, it is expressly intended that such parameter be suitably substituted for use in other embodiments. For example, the following description includes discussion of wicks having split configurations and wicks having printed subject matter formed thereon. Wicks having split configurations and printed subject matter are contemplated by this disclosure. That is, the present inventor has contemplated such combinations and intends that they be encompassed by this disclosure even if not written out.

In embodiments, a candle includes a body of meltable fuel and a wick. Meltable fuels are materials that are solid at room temperature and provide light when vaporized and ignited (i.e., when conveyed via a lit wick embedded in a body of the meltable fuel). Exemplary meltable fuels include fusible, flammable solid waxes and wax-like materials such as, for example, petroleum (paraffin) wax, mineral (montan) wax, synthetic wax (polyethylene or Fischer Tropsch), natural waxes (vegetable or animal—e.g., beeswax, carnauba, candelilla), microcrystalline waxes, polymers, polyesters, clear candle waxes or gels (ester-terminated polyamides (ETPA) or ETPA-based materials), and other fuels known to skilled artisans. A single meltable fuel or blends of meltable fuels may be used.

In embodiments, meltable fuels may be modified with additives to alter the hardness, color, burn rate, and/or aroma of the meltable fuel. Exemplary additives include stearic acid, UV inhibitors, polyethylene, scent oils, and colorants, such as pigments and/or dyes.

In embodiments, a candle includes a free standing body of meltable fuel. The shape of the free standing body of meltable fuel is not particularly limited—any shape that can be suitably molded would be acceptable.

In alternative embodiments, a candle includes a meltable fuel held in a container. There is no particular limitation on the size or shape of the container or the material from which the container is made. In embodiments, the container is made of glass, ceramic, metal, concrete, or plastic. The glass, ceramic, metal, concrete, or plastic may be natural, clear, or colored. In embodiments, the container is a resealable jar. In embodiments, the container is in the shape of a cylinder or prism open at a top end. The cylinder may be a right, oblique, or irregular cylinder having a circular, oval, or other cross-section. The prism may be a right, oblique, or irregular prism having a triangular, square, rectangular, or other polygonal cross-section.

Whether provided as freestanding bodies of meltable fuel or in containers, candles generally can be defined in terms of their width and height as configured when in use. Candles as described herein may have a width of up to 1 inches, 1 inches, 2 inches, 3 inches, 4 inches, 5 inches, 6 inches, 7 inches, 8 inches, 9 inches, 10 inches, 10 inches or more, and all subranges therein. Preferably candles have a width of 1 to 10 inches. Candles may have a height of up to 2 inches, 2 inches, 3 inches, 4 inches, 5 inches, 6 inches, 7 inches, 8 inches, 9 inches, 10 inches, 10 inches or more, and all subranges therein. Preferably candles have a height of 2 to 10 inches.

In embodiments, the material and thickness of a wick are selected to promote the candle's functionality as well as the candle's contributions to ambiance. In embodiments, the wick is made of wood, semi-wood or wood-like material and, when lit, provides a pleasant crackling sound and burns more thoroughly with less carbon heading and sooting than conventional wicks. Processed wood materials such as particleboard and fiberboard may also be used. Overall, woods having relatively straight, condensed grains and without checking make effective wicks. In contrast to traditional wicks, which require periodic trimming, maintenance of wood wicks can be performed with or without any tools. Rather, burned edges of wood wicks can be removed with the user's fingers, before relighting. In various exemplary embodiments, such wicks are formed of single-ply, double-ply, multi-ply, multi-fibrous, colored, printed, die cut and/or laser cut materials. Alternatively or in addition, materials embedded minerals, oils or oxidation enhancers may be used. The materials need not be strictly planar, but also may be curved or shaped in any dimension.

In embodiments, woods such as poplar, cherry, maple, wenge, oak, rosewood, and bamboo may be used as materials for preparing wicks. Preferably heartwood is used. Hard non-brittle, tight grain woods are preferred. Certain species may be preferable in particular applications because its higher moisture or oil content may influence characteristics of the flame and/or other properties such as production of a desirable crackling sound when burning. In addition to the preferred woods mentioned above, others such as walnut, ash, birch, pearwood, sapele, pommele, zebrawood, lacewood, mahogany, pine, teak, ebony, and various burls, may be used as wick materials. Woods having various moisture contents may be used. Particularly, woods having moisture contents of up to 1%, 1%, 2%, 3%, 4%, 5%, 6%, 7%, 8%, 9%, 10%, 11%, 12%, 13%, 14%, 15%, 16%, 17%, 18%, 19%, 20%, 20% more, and all subranges therein may be used to form wicks as described herein.

Wicks including semi-wood or wood-like materials, either alone or in combination with wood, are particularly desirable. Layers or portions of wood may be combined, for example, with layers or portions of wood-like materials, semi-wood materials, cellulose, hemicellulose, lignin, hemp fiber, coir, flax, and/or protein fibers. Alternatively, cellulose, hemicellulose, lignin, hemp fiber, coir, flax, and/or protein fiber, can used to prepare wicks without the use of wood. Material other than plain or pure wood, as described herein, may be used in any suitable format. For example, solid materials may be cut into sheets for further processing as described herein. As a further example, materials that are fibrous or particulate may be pressed in to sheets for further processing as described herein with or without the use of adhesives or other matrix materials.

Wicks including semi-wood or wood-like materials, either alone or in combination with wood, are particularly desirable. Layers or portions of wood may be combined, for example, with layers or portions of wood-like materials, semi-wood materials, cellulose, hemicellulose, lignin, hemp fiber, coir, flax, and/or protein fibers. Alternatively, cellulose, hemicellulose, lignin, hemp fiber, coir, flax, and/or protein fiber, can used to prepare wicks without the use of wood. Materials other than plain or pure wood, as described herein, may be used in any suitable format. For example, solid materials may be cut into sheets for further processing as described herein. As a further example, materials that are fibrous or particulate may be pressed in to sheets for further processing as described herein with or without the use of adhesives or other matrix materials. Further, two, or three, or more sheets of material obtained as described herein or otherwise may be laminated together, e.g., using adhesives. Such laminates may include multiple layers of the same or different materials and layers having different dimensions.

The wicks described herein and shown in figures attached hereto are generally planar or sheet-shaped or prepared from materials that planar or sheet-shaped. Such materials maybe further processed into precise shapes as described herein using techniques such as die cutting and laser cutting. However, as is evident from the description of spiral wicks below, the wicks of the present disclosure need not be planar or sheet-shaped. Such planar or sheet-shaped materials may be bent, rolled, molded, etc., to have three-dimensional structures, such as the generally cylindrical spiral wicks described herein. Such spiral wicks are spiral shaped when viewed from above. However, more complex structures, including structures that approximate alphanumeric or symbolic shapes when viewed from above are also contemplated.

Wicks described herein are intended to be used, e.g., in candles. When used in a candle, wicks are stood in a body of meltable fuel. Thus, wicks generally have a height dimension corresponding to the height dimension of a candle when the wick is in use. Likewise, wicks that are generally planar or sheet-shaped will have a width and a thickness that are perpendicular to the height, the thickness being the smallest dimension of the wick. Wicks that generally planar or sheet-shaped (e.g., generally cylindrical wicks) can be described by an overall width in a direction perpendicular to the height.

Wicks described herein may have any suitable combination of dimensions and the dimensions of particular embodiments are selected to produce desired effects described herein in combination with particular materials and other structural parameters. Wicks may have a thickness of up to 0.005 inches, 0.005 inches, 0.010 inches, 0.020 inches, 0.030 inches, 0.040 inches, 0.050 inches, 0.060 inches, 0.070 inches, 0.080 inches, 0.090 inches, 0.1 inches, 0.11 inches, 0.12 inches, 0.125 inches, 0.125 inches or more, and all subranges therein. Preferably wicks have a thickness of 0.005 to 0.125 inches. Wicks may have a width of up to 0.125 inches, 0.125 inches, 0.5 inches, 1.0 inches, 1.5 inches, 2.0 inches, 2.5 inches, 3.0 inches, 3.5 inches, 4.0 inches, 4.5 inches, 5.0 inches, 5.5 inches, 6.0 inches, 6.5 inches, 7.0 inches, 7.5 inches, 8.0 inches, 8.5 inches, 9.0 inches, 9.0 inches or more, and all subranges therein. Preferably wicks have a width of 0.125 to 9 inches. Wicks may have a height of up to 2 inches, 2 inches, 3 inches, 4 inches, 5 inches, 6 inches, 7 inches, 8 inches, 9 inches, 10 inches, 10 inches or more, and all subranges therein. Preferably wicks have a height of 2 to 10 inches. Wick width and candle width may be described in ratios of their respective widths and ranges of ratios based on any of the width values described herein. Further, in embodiments, both wicks and candles will have variable widths. For example, both wick and candle may have widths that taper towards the top, taper towards the bottom, taper towards the middle, or taper at the top and the bottom. In preferred embodiments, the wick width varies with the candle width along the height dimension of the candle.

When lit, candles will create wax pools that vary in size based on the wax type and the wick type and configuration. In preferred embodiments, the wax should liquidly to the outer portion of the candle and the flame height should be between 0.05 and 1.5 inches in height.

Cotton or cotton-like materials, particularly, can be incorporated into a wick's construction. One example is to sandwich a piece of cotton between the sheets of wood and seal the sandwiched construction with wax or an adhesive. Another example is to make a wood particle/powder fiberboard with small bits of cotton incorporated therein. A further example is to layer one or more layers of a cotton-like material to one or more layers of a wood-like material. The layers in such embodiments can be different or the same in width, height, and thickness.

In embodiments, candles can be made using containers or molds. In embodiments, a wick is positioned in a container or mold and a melted meltable fuel is added thereto. The wick can be positioned with or without a sustainer. A sustainer will include a flat surface or multiple points of contact on its bottom to stably hold a wick upright in the absence of meltable fuel and/or while melted fuel is poured around the wick. A sustainer will further include structure for holding a wick upright. For example, twin upright structures for grasping a generally planar or sheet like wick or a cup-like structure for holding a substantially cylindrical wick. In alternative embodiments the melted fuel can be added to the mold or container before positioning the wick.

In various exemplary embodiments, wicks according to the present disclosure may have a "closed split" configuration as shown in FIGS. 1(a) to 1(d). As shown in FIGS. 1(a) to 1(d), a wick 101 is formed of a planar material. The wick 101 is relatively thin when viewed from the side or top, and has a complex shape when viewed from the front. Particularly, the wick 101 has a top portion 105, a middle portion 110, and a bottom portion 115, when viewed from the front. The middle portion 110 is wider than the top portion 105 and the bottom portion 115, when viewed from the front. The middle portion 110 of the wick 101 has an opening 120, when viewed from the front. The wick 101 is deemed to have a "closed split" configuration because, when viewed form the front, the opening 120 is entirely enclosed by wick material. When provided in a candle 151, the top portion 105 of the wick 101 is provided at a top surface of the candle 151, and the wick 101 is held in place by placing the bottom portion 115 in a sustainer 171.

In preferred embodiments, wicks having a closed split configuration are composed of at least one of wood, a wood-like material, cotton, a cotton-like material, cellulose, hemicellulose, lignin, hemp fiber, coir, flax, and protein fiber. In preferred embodiments, wicks having a closed split configuration are formed from materials having multiple layers, in which one or more layers are booster layers (i.e., a separate layer the modifies or improves flow of melted fuel through wick) or layers of a wood-cotton blend. In embodiments, wicks having a closed split configuration have a width of 0.5 to 2 inches at top portion and bottom portions and a width of 0.375 to 1 inches at a middle portion (for each separated wick portion). In embodiments, wicks having a closed split configuration are used in candles having a width of 2.5 to 6 inches at top and bottom portions and 3 to 8 inches in a middle portion. In embodiments, such wicks are formed by die cutting or laser cutting a generally planar or sheet-shaped material.

With traditional wicks and proportionally cut wooden-like wicks, it can difficult to achieve consistent and optimal wax pooling in candles that vary in width from top to bottom. Varying the wick width and wick cut outs optimizes the candles' pooling effect for safer and optimal performance. Different types of waxes (paraffin, soy, coconut, palm, apricot, beeswax, gel, and vegetable and/or paraffin blends) all melt differently and have different viscosity and flash points. Therefore, the wax pool consistency and diameter varies significantly between waxes in the same candle size.

Split wicks are used to optimize the wick to vessel ratio in a manner that can be tailored to a particular wax or wax combination. In a wick having a "closed split" configuration, when burning commences there is a single wick. As the wick burns down, there will be two wicks. Finally, there will be a single wick again. This configuration and the corresponding width of the wick or portions thereof can be tailored to correspond to the thickness of a candle. Further, the wick need not be limited to two wicks in the intermediate period of the burn. Instead, the wick could split into three or more wicks during burning. Wicks having a closed split configuration are best for candles including containers with smaller openings at the top of the vessel and wider widths in the middle. Wicks having a closed split configuration may be formed of any suitable material as outlined above.

In various exemplary embodiments, wicks according to the present disclosure may have an "open split" configuration as shown in FIGS. 2(a) to 2(d). As shown in FIGS. 2(a) to 2(d), a wick 201 is formed of a planar material. The wick 201 is relatively thin when viewed from the side or top, and has a complex shape when viewed from the front. Particularly, the wick 201 has a top portion 205, a middle portion 210, and a bottom portion 215, when viewed from the front. The top portion 205 is wider than the middle portion 210, and the middle portion 210 is wider than the bottom portion 215, when viewed from the front. The top portion 205 and the middle portion 210 of the wick 201 are split to provide an opening 220, when viewed from the front. The wick 201 is deemed to have an "open split" configuration because, when viewed form the front, the opening 220 is enclosed at its bottom and side by wick material, not enclosed at a top edge of the wick 201. When provided in a candle 251, the top portion 205 of the wick 201 is provided at a top surface of the candle 251, and the wick 201 is held in place by placing the bottom portion 215 in a sustainer 271.

In preferred embodiments, wicks having an open split configuration are composed of at least one of wood, a wood-like material, cotton, a cotton-like material, cellulose, hemicellulose, lignin, hemp fiber, coir, flax, and protein fiber. In preferred embodiments, wicks having an open split configuration are formed from materials having multiple layers, in which one or more layers are booster layers or layers of a wood-cotton blend. In embodiments, wicks having an open split configuration have a width of 0.25 to 1.5 inches at top portion and middle portions (for each separated wick portion) and a width of 0.375 to 3 inches at a bottom portion. In embodiments, wicks having an open split configuration are used in candles having a width of 2.5 to 6 inches at top and middle portions and 2 to 5 inches in a middle portion. In embodiments, such wicks are formed by die cutting or laser cutting a generally planar or sheet-shaped material.

Wicks having an open split configuration start the burning period as two wicks, and subsequently pare down to a single wick. The wicks can be structured so that three or more wicks are present at the beginning of the burn period. Wicks having an open split configuration are best for candles including containers with wider openings at the top of the vessel and smaller bases. The open split configuration allows a candle to achieve optimum pooling of wax to the edges of a vessel for a longer lasting and burning candle. By employing the open split configuration, it is possible to use as much fuel as possible, which prevents over heating at the bottom of a candle during use, which, in turn, prevents a vessel from cracking. Wicks having an open split configuration may be formed of any suitable material, as discussed above. In embodiments in which a wick or portions of the wick are wide, e.g., 2 inches wide or more, it may be desirable to die cut or laser cut patterns into the wick to control the amount of heat generated when the wick is burned.

In various exemplary embodiments, wicks according to the present disclosure may have variable width configurations as shown in FIGS. 3(a) to 3(d), 4(a) to 4(d), and 5(a) to 5(d). As shown in FIGS. 3(a) to 3(d), a wick 301 is formed of a planar material. The wick 301 is relatively thin when viewed from the side or top, and has a variable shape when viewed from the front. Particularly, the wick 301 has a top portion 305, a middle portion 310, and a bottom portion 315, when viewed from the front. The top portion 305 is wider than the middle portion 310, and the middle portion 310 is wider than the bottom portion 315, when viewed from the front. The wick 301 thus has a variable width that tapers from the top to the bottom. When provided in a candle 351, the top portion 305 of the wick 301 is provided at a top surface of the candle 351, and the wick 301 is held in place by placing the bottom portion 315 in a sustainer 371.

In preferred embodiments, wicks having a variable width that tapers from the top to the bottom are composed of at least one of wood, a wood-like material, cotton, a cotton-like material, cellulose, hemicellulose, lignin, hemp fiber, coir, flax, and protein fiber. In preferred embodiments, wicks having a variable width that tapers from the top to the bottom are formed from materials having multiple layers, in which one or more layers are booster layers or layers of a wood-cotton blend. In embodiments, wicks having a variable width that tapers from the top to the bottom have a width of 0.5 to 5 inches at top portion, a width of 0.375 to 5.5 inches at a middle portion, a width of 2 to 7 inches at a bottom portion. In embodiments, wicks having a variable width that tapers from the top to the bottom are used in candles having a width of 2.5 to 9 inches at a top portion and 2 to 7 inches at a bottom portion. In embodiments, such wicks are formed by die cutting or laser cutting a generally planar or sheet-shaped material.

As shown in FIGS. 4(a) to 4(d), a wick 401 is formed of a planar material. The wick 401 is relatively thin when viewed from the side or top, and has a variable shape when viewed from the front. Particularly, the wick 401 has a top portion 405, a middle portion 410, and a bottom portion 415, when viewed from the front. The top portion 405 is wider than the middle portion 410, but the middle portion 410 is narrower than the bottom portion 415, when viewed from the front. The wick 401 thus has a variable width that tapers in the middle. When provided in a candle 451, the top portion 405 of the wick 401 is provided at a top surface of the candle 451, and the wick 401 is held in place by placing the bottom portion 415 in a sustainer 471.

In preferred embodiments, wicks having a variable width that tapers in the middle are composed of at least one of wood, a wood-like material, cotton, a cotton-like material, cellulose, hemicellulose, lignin, hemp fiber, coir, flax, and protein fiber. In preferred embodiments, wicks having a variable width that tapers in the middle are formed from materials having multiple layers, in which one or more layers are booster layers or layers of a wood-cotton blend. In embodiments, wicks having a variable width that tapers in the middle have a width of 0.5 to 3 inches at a top portion, a width of 0.375 to 4.5 inches at a middle portion, a width of 0.425 to 4.75 inches at a bottom portion. In embodiments, wicks having a variable width that tapers in the middle are used in candles having a width of 2.5 to 6 inches at a top portion, a width of 2 to 5 inches at a middle portion, and 2.25 to 5.5 inches at a bottom portion. In embodiments, such wicks are formed by die cutting or laser cutting a generally planar or sheet-shaped material.

As shown in FIGS. 5(a) to 5(d), a wick 501 is formed of a planar material. The wick 501 is relatively thin when viewed from the side or top, and has a variable shape when viewed from the front. Particularly, the wick 501 has a top portion 505, a middle portion 510, and a bottom portion 515, when viewed from the front. The top portion 505 is narrower than the middle portion 510, and the middle portion 510 is wider than the bottom portion 515, when viewed from the front. The wick 501 thus has a variable width that tapers at the top and the bottom. When provided in a candle 551, the top portion 505 of the wick 501 is provided at a top surface of the candle 551, and wick 501 is held in place by placing the bottom portion 515 in a sustainer 571.

In preferred embodiments, wicks having a variable width that tapers at the top and the bottom are composed of at least one of wood, a wood-like material, cotton, a cotton-like material, cellulose, hemicellulose, lignin, hemp fiber, coir, flax, and protein fiber. In preferred embodiments, wicks having a variable width that tapers at the top and the bottom are formed from materials having multiple layers, in which one or more layers are booster layers or layers of a wood-cotton blend. In embodiments, wicks having a variable width that tapers at the top and the bottom have a width of 0.375 to 3 inches at a top portion, a width of 0.5 to 3.5 inches at a middle portion, a width of 0.25 to 2.5 inches at a bottom portion. In embodiments, having a variable width that tapers at the top and the bottom are used in candles having a width of 2 to 5 inches at a top portion, a width of 3 to 6 inches at a middle portion, and 2 to 5 inches at a bottom portion. In embodiments, such wicks are formed by die cutting or laser cutting a generally planar or sheet-shaped material.

Wicks with variable width configurations may be used in candles with different widths from top to bottom. Wicks with variable width configurations may be selected to follow the contours of a candle vessel to allow for an optimal burn from the beginning to the end of the life of a candle. A candle burns hotter at the bottom of the candle due to the lack of oxygen. Fragrance, dyes, and other additives fall to the bottom of the candle which lowers the flashpoint. Therefore, a wick with less wicking material at the bottom is a safer solution even if the candle vessel has parallel walls. Cotton wicks and current planar wicks do not achieve this. Therefore it is preferable to have less wicking material as the candle burns down.

In various exemplary embodiments, wicks according to the present disclosure may have cut out print designs as shown in FIGS. 6(a) to 6(f). As shown in FIGS. 6(a) to 6(f), a wick 601 is formed of a planar material. The wick 601 is relatively thin when viewed from the side or top, and has a rectangular shape when viewed from the front. Particularly, the wick 601 has a cut out portion 630 including a design provided at a top edge when viewed from the front. The cut out portion 630 goes entirely through the wick material as shown by the reverse design shown by comparing the front and back views of the wick 601 shown in FIGS. 6(a) and 6(b). When provided in a candle 651, the top edge of the wick 601 protrudes from a top surface of the candle 651 and the wick 601 is held in place by placing the bottom edge of the wick 601 in a sustainer 671. The candle 651 may include a container 661 holding a body of meltable fuel 681. In such case the cut out portion 630 including a design appears above the surface of the body of meltable fuel 681.

In preferred embodiments, wicks having cut out print designs are composed of at least one of wood, a wood-like material, cotton, a cotton-like material, cellulose, hemicellulose, lignin, hemp fiber, coir, flax, and protein fiber. In preferred embodiments, wicks having cut out print designs are formed from materials having multiple layers, in which one or more layers are booster layers or layers of a wood-cotton blend. In embodiments, wicks having cut out print designs have a width of 0.125 to 6 inches. In embodiments, wicks having cut out print designs are used in candles having a width of 1 to 10 inches.

Wicks with cut out print designs may be die cut, engraved, or laser cut with letters, words, and/or symbols. The cut out portions can be provided at the top of a wick or over an entire length of a wick.

In various exemplary embodiments, wicks according to the present disclosure may have cut out lattice designs as shown in FIGS. 7(a) to 7(e), 8(a) to 8(e), and 9(a) to 9(e). As shown in FIGS. 7(a) to 7(e), a wick 701 is formed of a planar material. The wick 701 is relatively thin when viewed from the top (or side), and has a generally rectangular shape when viewed from the front. The width of the wick 701, when viewed from the front may be relatively wide or narrow in comparison with the width of a candle in which the wick 701 is provided. Particularly, the wick 701 includes numerous openings 720 forming a lattice. The openings 720 are generally formed over the entirety of the surface of the wick 701 when viewed from the front. The openings 720 have an area that is the same or greater than the area of solid portions of the wick when viewed from the front. However, it may be desirable to provide a portion without openings at the bottom edge for ease of handling. When provided in a candle 751, the top edge of the wick 701 protrudes from a top surface of the candle 751 and the wick 701 is held in place by placing the bottom edge of the wick 701 in a sustainer 771. The sustainer 771 may grasp a portion without openings at the bottom edge of the wick 701 for improved stability.

As shown in FIGS. 8(a) to 8(e), a wick 801 is formed of a planar material. The wick 801 is relatively thin when viewed from the top (or side), and has a generally rectangular shape when viewed from the front. The width of the wick 801, when viewed from the front may be relatively wide or narrow in comparison with the width of a candle in which the wick 801 is provided. Particularly, the wick 801 includes numerous openings 820 forming a lattice. The openings 820 are generally formed over the entirety of the surface of the wick 801 when viewed from the front. The openings 820 have an area that is less than the area of solid portions of the wick when viewed from the front. It may be desirable to provide a portion without openings at the bottom edge for ease of handling. When provided in a candle 851, the top edge of the wick 801 protrudes from a top surface of the candle 851 and the wick 801 is held in place by placing the bottom edge of the wick 801 in a sustainer 871. The sustainer 871 may grasp a portion without openings at the bottom edge of the wick 801 for improved stability.

As shown in FIGS. 9(a) to 9(e), a wick 901 is formed of a planar material. The wick 901 is relatively thin when viewed from the top (or side), and has a generally rectangular shape when viewed from the front. The width of the wick 901, when viewed from the front may be relatively wide or narrow in comparison with the width of a candle in which the wick 901 is provided. Particularly, the wick 901 includes numerous openings 920 forming a lattice. The openings 920 are generally formed over the entirety of the surface of the wick 901 when viewed from the front. The openings 920 are provided in a configuration such that solid portions of the wick 901, i.e., portions enclosing the openings 920, are directed dominantly from the top to the bottom. However, it may be desirable to provide a portion without openings at the bottom edge for ease of handling. When provided in a candle 951, the top edge of the wick 901 protrudes from a top surface of the candle 951 and the wick 901 is held in place by placing the bottom edge of the wick 901 in a sustainer 971. The sustainer 971 may grasp a portion without openings at the bottom edge of the wick 901 for improved stability.

In preferred embodiments, wicks having cut out lattice designs are composed of at least one of wood, a wood-like material, cotton, a cotton-like material, cellulose, hemicellulose, lignin, hemp fiber, coir, flax, and protein fiber. In preferred embodiments, wicks having cut out lattice designs are formed from materials having multiple layers, in which one or more layers are booster layers or layers of a wood-cotton blend. In embodiments, wicks having cut out lattice designs have a width of 0.375 to 6 inches. In embodiments, wicks having cut out lattice designs are used in candles having a width of 2 to 9 inches.

Wicks with cut out lattice designs may be die cut, engraved, or laser cut with repetitive patterns or motifs. The cut out portions may be provided over an entire area of a wick. Wicks with cut out lattice designs are configured to burn more effectively by creating a pattern of openness throughout the wicks. Wicks with cut out lattice designs may be formed of any suitable material, as discussed above. The patterns may be selected so that oxygen and molten fuel are directed more efficiently through the wick or in a manner in which direction of flow is controlled. The patterns may be selected to control the size and shape of the flame. Wicks having a width of less than 1 inch typically have a design to help the wick burn more effectively with less wicking material and to assist in the flow of the fuel.

With respect to the wicks having cut out lattice designs shown in FIGS. 9(a) to 9(f), it should be appreciated that this specific configuration is tailored to vertical cellulose flow and directional design flow to increase the flow of the fuel and make burning more consistent. Thus, the wick burns in an optimum manner. Such wicks are desirably made from fibrous materials.

In various exemplary embodiments, wicks according to the present disclosure may be dyed wicks as shown in FIGS. 10(a) to 10(r). As shown in FIGS. 10(a) to 10(r), a wick 1001 is formed of a planar material. The wick 1001 is relatively thin when viewed from the side or the top, and has a generally rectangular shape when viewed from the front. The wick may include multiple layers, including primary layers 1003 having a first thickness and secondary layers 1007 having a second, smaller thickness. The wick 1001 in FIGS. 10(a) to 10(c) includes a single primary layer 1003. The wick 1001 in FIGS. 10(d) to 10(f) includes a single primary layer 1003 and a single secondary layer 1007. The wick 1001 in FIGS. 10(g) to 10(i) includes a single primary layer 1003 and two secondary layers 1007 sandwiching the primary layer 1003. The wick 1001 in FIGS. 10(j) to 10(l) includes two primary layers 1003 sandwiching a single secondary layer 1007. The wick 1001 in FIGS. 10(m) to 10(o) includes two primary layers 1003. The materials from which one or more of the primary layers 1003 and secondary layers 1007 of the wick 1001 are formed are dyed so that the wick 1001 in whole or part is colored. When provided in a candle 1051, the top edge of the wick 1001 protrudes from a top surface of the candle 1051 and the wick 1001 is held in place by placing the bottom edge of the wick 1001 in a sustainer 1071. The candle 1051 may include a container 1061 holding a body of meltable fuel 1081. In such case the cut out portion 1030 including a design appears above the surface of the body of meltable fuel 1081.

In preferred embodiments, dyed wicks are composed of at least one of wood, a wood-like material, cotton, a cotton-like material, cellulose, hemicellulose, lignin, hemp fiber, coir, flax, protein fiber, and other fibrous materials. Dyed wicks may be formed of a single layer of any of the foregoing materials. In preferred embodiments, dyed wicks are formed of multiple layers of any of the foregoing materials or combinations of the foregoing materials, in which one or more layers are booster layers or layers of a wood-cotton blend. In embodiments, dyed wicks have a width of 0.125 to 6 inches. In embodiments, dyed wicks are used in candles having a width of 1 to 10 inches. In embodiments, such wicks are formed by die cutting or laser cutting a generally planar or sheet-shaped material.

Exemplary dyed wicks may be colored with food dyes, alcohol dyes, natural dyes, acid dyes, solvent dyes, sulfur dyes, reactive dyes, and/or substantive dyes. Dyed wicks may be dyed to have any desired color including, for example, any NCS 1950 standard colors. Instead of, or in addition to dyes, the interlayer wick or dye could be treated with one or more salts known to yield a colored flame, such as cupric chloride, lithium chloride, strontium chloride, copper sulfate, sodium borate, calcium chloride, potassium chloride, sodium chloride, sodium carbonate, magnesium, and iron filings. The dyed wicks may be arranged in numerous structural arrangements. As shown in FIGS. 10(*a*) to 10(*r*), such arrangements may include, for example, single-ply, booster-on-one side, booster-on-two sides, multi-ply, multi-fibrous, sandwiched, and double-wicked configurations. Dyed wicks may be generally planar or have generally planar components. Dyed wicks alternatively may not be planar or sheet-shaped, but may have or include components that are spiral shaped jwhen viewed from above or approximate alphanumeric or symbolic shapes when viewed from above. Particularly preferred are wicks or wick components that are curved, round, spiral, alphabetical and/or cross- or X-shaped when viewed from above. Dyed wicks may be formed of any suitable material as described above.

Dyed wicks can be provided in multi-component structures in which some or all components are dyed. Wicks may be multi-colored and/or may include layers that are multi-colored. In embodiments, dyes and wick materials can be selected so that the dye bleeds and is released into the wax or other molten fuel either during manufacture or when the candle is burned, alternatively fast dyes may be selected. More particularly, dyes can be selected that are released into the body of meltable fuel during manufacture and/or later when the candle is lit by the consumer. Further, combinations of wick materials and dyes that tend to result in bleeding of the dye can be treated (e.g., heating, curing, coating, etc.) so that the dye does not bleed into the wax or other molten fuel either during manufacture or when the candle is lit, or does not bleed until desired (e.g., during use but not manufacture, or only in a later phase of use). Dyes may be applied, for examples, by soaking or spraying a dye solution and subsequently drying the dyed wick.

Exemplary dyes, identified by Colour Index International generic names and numbers, are listed below.

| Common name | Synonyms | C.I. generic name | C.I. number |
| --- | --- | --- | --- |
| Alcian yellow GXS | Sudan orange | Ingrain yellow 1 | 12840 |
| Alizarin | | Mordant red 11 | 58000 |
| Alizarin red S | | Mordant red 3 | 58005 |

-continued

| Common name | Synonyms | C.I. generic name | C.I. number |
| --- | --- | --- | --- |
| Alizarin yellow GG | | Mordant yellow 1 | 14025 |
| Alizarin yellow R | | Mordant orange 1 | 14030 |
| Azophloxin | Azogeranin B | Acid red 1 | 18050 |
| Bismarck brown R | Vesuvine brown | Basic brown 4 | 21010 |
| Bismarck brown Y | Vesuvine Phenylene brown | Basic brown 1 | 21000 |
| Brilliant cresyl blue | Cresyl blue BBS | Basic dye | 51010 |
| Chrysoidine R | | Basic orange 1 | 11320 |
| Chrysoidine Y | | Basic orange 2 | 11270 |
| Congo red | | Direct red 28 | 22120 |
| Crystal violet | | Basic violet 3 | 42555 |
| Fuchsin acid | | Acid violet 19 | 42685 |
| Gentian violet | | Basic violet 1 | 42535 |
| Janus green | | Basic dye | 11050 |
| Lissamine fast yellow | Yellow 2G | Acid yellow 17 | 18965 |
| Malachite green | | | |
| Martius yellow | | Acid yellow 24 | 10315 |
| Meldola blue | Phenylene blue | Basic blue 6 | 51175 |
| Metanil yellow | | Acid yellow 36 | 13065 |
| Methyl orange | | Acid orange 52 | 13025 |
| Methyl red | | Acid red 2 | 13020 |
| Naphthalene black 12B | Amido black 10B | Acid black 1 | 20470 |
| Naphthol green B | | Acid green 1 | 10020 |
| Naphthol yellow S | | Acid yellow 1 | 10316 |
| Orange G | | Acid orange 10 | 16230 |
| Rose Bengal | | Acid red 94 | 45440 |
| Sudan II | | Solvent orange 7 | 12140 |
| Titan yellow | | Direct yellow 9 | 19540 |
| Tropaeolin O | Sulpho orange | Acid orange 6 | 14270 |
| Tropaeolin OO | | Acid orange 5 | 13080 |
| Tropaeolin OOO | Orange II | Acid orange 7 | 15510 |
| Victoria blue 4R | | Basic blue 8 | 42563 |
| Victoria blue B | | Basic blue 26 | 44045 |
| Victoria blue R | | Basic blue 11 | 44040 |
| Xylene cyanol FF | | Acid blue 147 | 42135 |

Dyeing a wick can serve and aesthetic purpose, but can also serve a functional purpose. For example, depending on the properties of the dye and the portions or layers of a wick that are dyed, dyeing can influence the flow of melted fuel through the wick and the characteristics of the flame. As a result, a candle including the exemplary wick could burn faster or slower, or have a larger or smaller flame, than a like wick that is not dyed and/or that is dyed in a uniform manner. Thus, it is possible, by selecting dyes and the portions of the wick to be dyed, to control of various aspects of the manner in which the wick burns in a lit candle.

In embodiments, a wick is dyed in a single color. In further embodiments, a wick is dyed in a least two different colors. For example, a wick may have different colors in a series or gradient (e.g., pink-to-red, or colors of visible spectrum) along the wick in one or more dimensions. If so arranged in the height dimension, burning a candle including such an exemplary wick will reveal a series of colored portions of the wick and/or cause a series of different colors of dye to bleed into the wax or other meltable fuel of the candle. In embodiments, a dyed wick may, in addition to being dyed, be printed, laser-cut, laser etched, and/or stamped with a pattern or design that is either aesthetic (e.g., a message or graphic) or influences the manner in which the candle burns (e.g., patterns that speed or slow the speed at which a wax or other molten fuel is transported through the wick). The pattern or design may be present on one side of a wick, both sides of a wick, or may be cut-out so as to appear on both sides of a wick. In such embodiments, burning a candle including the exemplary wick will cause the wax or other meltable fuel to become translucent, revealing the pattern or design and/or the pattern or design will be revealed as the wick and wax or other molten fuel are consumed.

In various exemplary embodiments, wicks according to the present disclosure may have printed designs formed thereon as shown in FIGS. 11(a) to 11(f) and 12(a) to 12(e). As shown in FIGS. 11(a) to 11(f) a wick 1101 is formed of a planar material. The wick 1101 is relatively thin when viewed from the side or top, and has a rectangular shape when viewed from the front. Particularly, the wick 1101 has a printed portion 1140 including a design provided at a top edge when viewed from the front. The printed portion 1140 is repeated on both sides of the wick as shown by comparing the front and back views of the wick 1101 shown in FIGS. 11(a) and 11(b). When provided in a candle 1151, the top edge of the wick 1101 protrudes from a top surface of the candle 1151 and the wick 1101 is held in place by placing the bottom edge of the wick 1101 in a sustainer 1171. The candle 1151 may include a container 1161 holding a body of meltable fuel 1181. In such case the printed portion 1140 including a design appears above the surface of the body of meltable fuel 1181.

In preferred embodiments, wicks having printed designs formed at a top edge are composed of at least one of wood, a wood-like material, cotton, a cotton-like material, cellulose, hemicellulose, lignin, hemp fiber, coir, flax, and protein fiber. In preferred embodiments, wicks having printed designs formed at a top edge are formed from materials having multiple layers, in which one or more layers are booster layers or layers of a wood-cotton blend. In embodiments, wicks having printed designs formed at a top edge have a width of 0.25 to 3 inches. In embodiments, wicks having printed designs formed at a top edge are used in candles having a width of 1 to 6 inches. In embodiments, such wicks are formed by die cutting or laser cutting a generally planar or sheet-shaped material.

As shown in FIGS. 12(a) to 12(f) a wick 1201 is formed of a planar material. The wick 1201 is relatively thin when viewed from the side or top, and has a rectangular shape when viewed from the front. Particularly, the wick 1201 has a printed surface 1245 including a design provided over an entirety of the surface of the wick 1201. The printed surface 1245 is repeated on both sides of the wick as shown by comparing the front and back views of the wick 1201 shown in FIGS. 12(a) and 12(b). When provided in a candle 1251, the top edge of the wick 1201 protrudes from a top surface of the candle 1251 and the wick 1201 is held in place by placing the bottom edge of the wick 1201 in a sustainer 1271.

In preferred embodiments, wicks having printed designs over an entire surface are composed of at least one of wood, a wood-like material, a paper/wood material, cotton, a cotton-like material, cellulose, hemicellulose, lignin, hemp fiber, coir, flax, and protein fiber. In preferred embodiments, wicks having printed designs over an entire surface are formed from materials having multiple layers, in which one or more layers are booster layers or layers of a wood-cotton blend. In some such embodiments, the wicks are curved and/or multicolored. In embodiments, wicks having printed designs over an entire surface have a width of 0.125 to 6 inches. In embodiments, wicks having printed designs over an entire surface are used in candles having a width of 1 to 10 inches. In embodiments, such wicks are formed by die cutting or laser cutting a generally planar or sheet-shaped material.

Wicks having printed designs formed thereon may be laser cut, printed, or stamped with letters, words, and/or symbols. Printed designs may be formed, e.g., by engraving or by printing. Images may include, for example, black and white graphics, laser graphics, images made with markers or by stamping, painted graphics, words, and/or color photographs. The printed item can be duplicated on both sides or there can be two different images on each side. Wicks having printed designs formed thereon may be formed of any suitable material, as described above.

In embodiments as shown in FIGS. 12(a) to 12(e), wicks may be laser cut, printed or stamped with letters, words, and/or symbols throughout the entire wick. When the candle burns the natural or gel wax liquefies and becomes translucent and therefore a message or graphic is revealed. Wicks having printed designs on the entire wick may be formed of any suitable material, as described above. The printed item can be duplicated on both sides or there could be two different images on each side. The printed item can be a photo, laser cut, stamped, engraved etc. The printed item can be on the wood or fibrous material or on a piece of paper then adhered to the outer sides. The printed item can be formed with a fluorescent or phosphorescent ink so that the printed subject matter glows in the dark.

Printing on a wick can serve and aesthetic purpose, but can also serve a functional purpose. For example, depending on the pattern of the printed image (e.g., vertical lines or a dominantly vertical pattern) and the manner the printed image is formed (e.g., attachment of a material onto the wick, engraving or otherwise removing material from the wick), the printed image can influence the flow of melted fuel through the wick and the size and shape of the flame. Thus, it is possible, using a printed image, to control of various aspects of the manner in which the wick burns in a lit candle, including the rate of flow of melted fuel, rate and temperature at which the wick burns, wax pool size, etc. Further, the printed image can serve a functional purpose, indicating the type or origin of a candle and/or providing notice or an estimate of the amount of time remaining in the life of the candle. Also, printed subject matter can serve a security purpose, ensuring that a candle has not been modified and/or that a consumer's use of the candle is the first use.

Figure 13G:
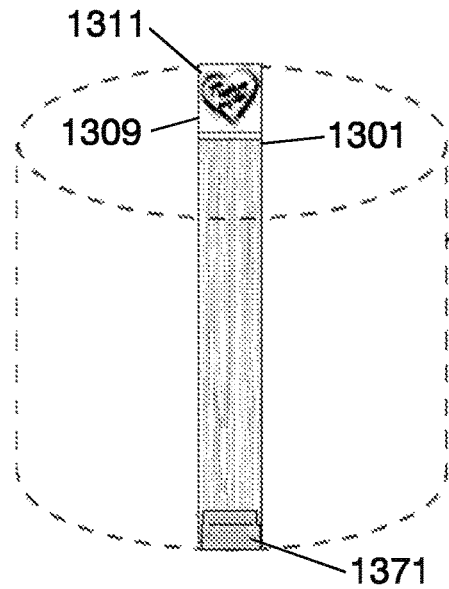
FIG. 13(g) is a perspective view of an exemplary wick having a first printed insert according to the present invention shown in the environment of a candle.
Figure 13H:
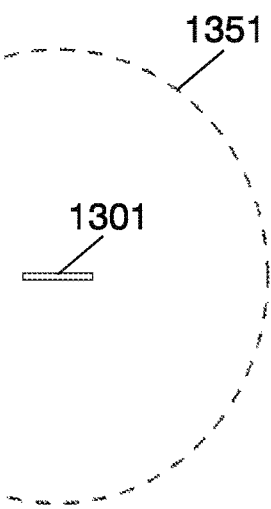
FIG. 13(a) is a front view of an exemplary wick having a first printed insert according to the present invention.
FIG. 13(b) is a back view of an exemplary wick having a first printed insert according to the present invention.
FIG. 13(c) is a side view of an exemplary wick having a first printed insert according to the present invention.
FIG. 13(d) is a front view of an exemplary wick having a second printed insert according to the present invention.
FIG. 13(e) is a back view of an exemplary wick having a second printed insert according to the present invention.
FIG. 13(f) is a side view of an exemplary wick having a second printed insert according to the present invention.
FIG. 13(*h*) is a top view of an exemplary wick having a first printed insert according to the present invention shown in the environment of a candle.
Figure 13I:
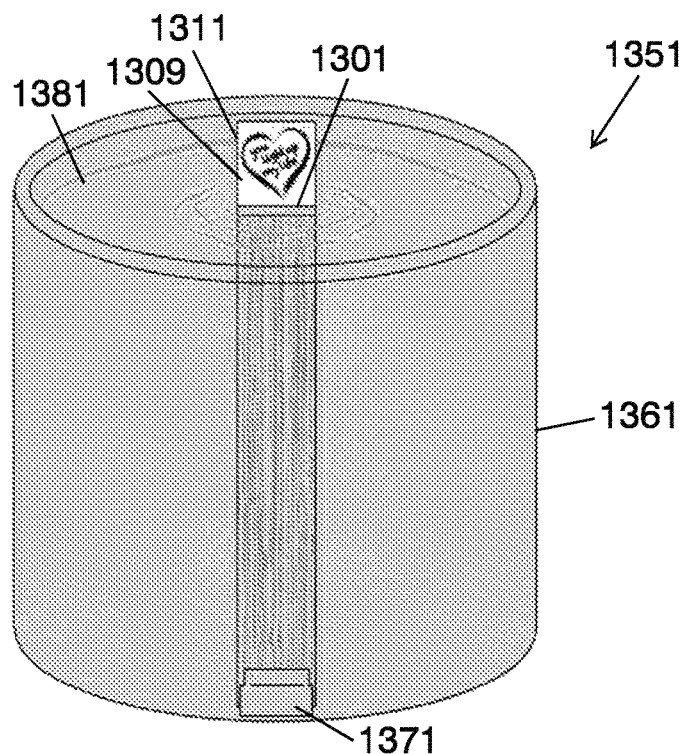

In various exemplary embodiments, wicks according to the present disclosure may have printed inserts included therein as shown in FIGS. 13(a) to 13(i). As shown in FIGS. 13(a) to 13(i) a wick 1301 is formed of a planar material. The wick 1301 is relatively thin when viewed from the side or top, and has a generally rectangular shape when viewed from the front. The wick includes two primary layers 1303 sandwiching an interlayer 1311. The interlayer includes top portion 1311 which is printed with a design. The top portion 1311 has a design that is repeated on both sides of the wick 1301 as shown by comparing the front and back views of the wick 1301 shown in FIGS. 13(a), 13(b), 13(d), and 13(e). As shown in FIGS. 13(d) and 13(e), the top portion 1311 of the interlayer 1309 can have a shape, in this case a heart shape but alternatively any alphanumeric or symbol shape in any known or later developed font, that is different from the remainder of the interlayer 1309. When provided in a candle 1351, the top edge of the wick 1301 protrudes from a top surface of the candle 1351 and the wick 1301 is held in place by placing the bottom edge of the wick 1301 in a sustainer 1371. The candle 1351 may include a container 1361 holding a body of meltable fuel 1381. In such case the top portion 1311 of the interlayer 1309 including a design appears above the surface of the body of meltable fuel 1381.

In preferred embodiments, wicks having printed designs over an entire surface are composed of at least one of wood, a wood-like material, cotton, a cotton-like material, cellulose, hemicellulose, lignin, hemp fiber, coir, flax, and protein fiber. In preferred embodiments, the interlayer of such wicks is formed of paper or a paper/wood combination having printing thereon. In preferred embodiments, wicks having printed designs over an entire surface are formed from materials having multiple layers, in which one or more layers are booster layers or layers of a wood-cotton blend. In some such embodiments, the wicks are curved and/or multicolored. In embodiments, wicks having printed designs over an entire surface have a width of 0.375 to 3 inches. In embodiments, wicks having printed designs over an entire surface are used in candles having a width of 2 to 6 inches. In embodiments, such wicks are formed by die cutting or laser cutting a generally planar or sheet-shaped material. A composite structure including primary and interlayers and/or separate sublayers may be shaped by die cutting or laser cutting.

In such wicks, a graphic is showcased at the top of the wick either on a piece of wood, fibrous material, or paper (or other material described herein), that serves as an interlayer. The interlayer can be sandwiched between two primary wick layers or could be adhered to a single primary wick layer. In embodiments, the protruding portion of the interlayer can be easily breakable/snap-able prior to burning the wick. The graphic item could be the same width as the wick or could be a unique shape. In embodiments, height above the wick should be assessed for optimal burn. Preferably, the top portion of the interlayer extends 0.25 to one inches above the primary layers of the wick. In embodiments employing black and white graphics, laser graphics, markers, stamping, painted graphics, color photos, etc., can be employed. Further, the interlayer can be treated with a material that will change the color of the flame when the interlayer is burnt. For example, the interlayer could be treated with at least one of cupric chloride, lithium chloride, strontium chloride, copper sulfate, sodium borate, calcium chloride, potassium chloride, sodium chloride, sodium carbonate, magnesium, and iron filings.

In addition to aesthetic possibilities, the protruding portion of the interlayer can serve various purposes, including providing an initial radiant burn if lit before the remainder of the wick. That is, the interlayer can be formed of a material that burns quite differently from the other layers of the wick. Further, the protruding portion of the interlayer can be used for identification and/or security purposes—e.g., to indicate the type or origin of a candle and to ensure that a candle has not been modified and/or that a consumer's use of the candle is the first use.

Figure 14A:
FIG. 14(*a*) is a front view of an exemplary wick having a first spiral configuration according to the present invention.
Figure 14B:
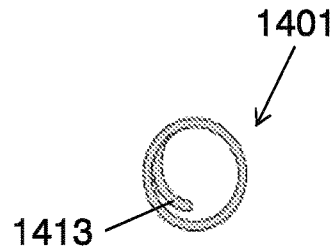
Figure 14C:
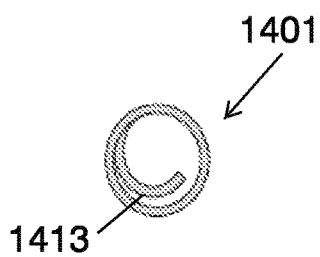
Figure 14D:
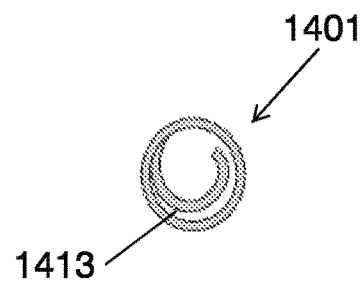
Figure 14E:
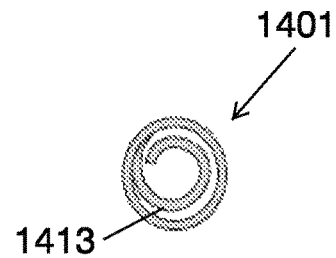
Figure 14F:
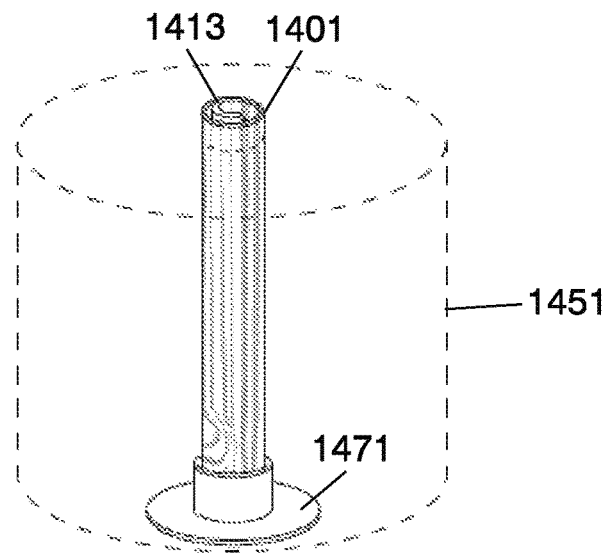
Figure 14G:
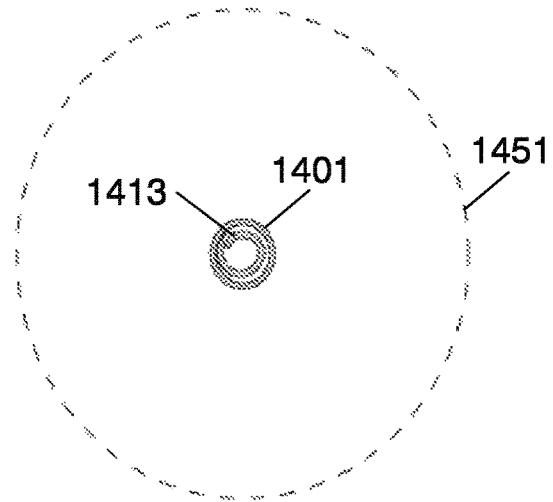

In various exemplary embodiments, wicks according to the present disclosure may be wicks having spiral configurations as shown in FIGS. 14(a) to 14(g). As shown in FIGS. 14(a) to 14(g) a wick 1401 is formed of a planar material that is rolled or wound to form a generally cylindrical shape. The planar material is rolled so that, when viewed from the top, at least some portions of the circumference of the cylindrical shape include two layers of wick material. For example, in FIG. 14(b), the wick 1401 is rolled so approximately a quarter of the circumference of the cylindrical shape includes two layers of wick material. In FIG. 14(c), the wick 1401 is rolled so approximately a half of the circumference of the cylindrical shape includes two layers of wick material. In FIG. 14(d), the wick 1401 is rolled so approximately three quarters of the circumference of the cylindrical shape includes two layers of wick material. In FIG. 14(e), the wick 1401 is rolled so approximately the entirety of the circumference of the cylindrical shape includes two layers of wick material. When provided in a candle 1451, the top edge of the wick 1401 protrudes from a top surface of the candle 1451 and the wick 1401 is held in place by placing the bottom edge of the wick 1401 in a sustainer 1471.

Wicks having a spiral configuration may be prepared by die cutting or laser cutting a sheet of wick material to have appropriate dimensions, and then rolling the sheet into a substantially cylindrical shape so that there is significant overlap of layers forming the circumference of the cylinder. The sheet of wick material may have a thickness of from 0.005 to 0.03 inches, and preferably 0.02 to 0.03 inches. Prior to rolling, the sheet of wick material may have a length in the rolling direction of 15 to 75 mm and preferably 25 to 50 mm. In embodiments, the sheet of wick material is helically rolled into a substantially cylindrical shape. The rolled wick may be prepared, for example, by wetting a sheet of a wick material, rolling the sheet of wick material into a substantially cylindrical shape, and drying the rolled sheet of wick material. Rolling the sheet of wick material may comprise rolling the wick material around a cylindrical object. Drying the rolled sheet may comprise storing the rolled sheet of wick material in a tube.

Spiral wicks are particularly useful in candle manufacture because the shape of the wick allows for structural strength even when using particularly thin wick materials. That is, a thin material that is not capable of standing on its own can be stood when wound into a spiral wick. Also, selecting the number of layers of wick material and/or the degree of overlap of layers forming the circumference of the cylindrical wick allows for control of various aspects of the manner in which the wick burns in a lit candle, including the rate of flow of meltable fuel, rate and temperature at which the wick burns, wax pool size, etc. In embodiments, a spiral configuration offers a robust flame for vegetable wick blends. The width of the sheet of wood or fibrous material is decided based on how many layers the spiral should turn based on the top of wax. For example, it may be desirable to form a thicker wick for soy wax. The width of the wood is typically between 0.5 to 2 inches. The width of the wick is typically 0.3 to one inches. The thickness of the material is typically in a range of 0.005 to 0.03 inches. Wicks having spiral configurations may be formed of any suitable material, as discussed above. Preferably, the material is wood or a fibrous material, but may be made of any material described herein. The spiral wicks may be combined with other wicks. For example, a wood, wood-like, or other wick as described herein, or a more typical cotton wick, may be placed in the center of the cylindrical spiral wick to form a compound wick.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present invention is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A wick, comprising:
 a sheet of wick material;
 wherein:
 the sheet of wick material has a height dimension, a width dimension, and a thickness dimension;

the height dimension and the width dimension are greater than the thickness dimension;

the height dimension extends from a top of the sheet of wick material to a bottom of the sheet of wick material as the sheet of wick material is oriented when provided in a candle;

the width dimension and the thickness dimension are perpendicular to the height dimension;

a visible pattern is formed on at least one surface of the sheet of wick material by engraving or otherwise removing material from the wick; and the visible pattern does not extend through the wick material in the thickness dimension.

2. The wick according to claim 1, wherein the visible pattern is formed on the at least one surface of the sheet of wick material by engraving or otherwise removing material from the wick with a laser.

3. The wick according to claim 1, wherein the height dimension is greater than the width dimension.

4. The wick according to claim 3, wherein the visible pattern is provided on the at least one surface only at locations within height/4 of the top of the wick prior to use.

5. The wick according to claim 1, wherein:
the visible pattern is configured to alter flow of melted fuel through the wick and/or characteristics of a flame produced by wick, when the wick is used in a candle, relative to a wick without the visible pattern; and
the visible pattern comprises at least one vertical line.

6. A candle, comprising the wick according to claim 1 and a meltable fuel.

7. The candle according to claim 6, wherein:
the wick is provided in the meltable fuel; and
the visible pattern is configured to be seen through the meltable fuel when the candle is in use.

8. A wick, comprising:
a sheet of wick material;
wherein:
the sheet of wick material has a height dimension, a width dimension, and a thickness dimension;
the height dimension and the width dimension are greater than the thickness dimension;
the height dimension extends from a top of the sheet of wick material to a bottom of the sheet of wick material as the sheet of wick material is oriented when provided in a candle;
the width dimension and the thickness dimension are perpendicular to the height dimension;
at least a portion of the sheet of wick material is dyed;
the dyed portion of the sheet of wick material is dyed with a dyeing material that has at least one effect selected from the group consisting of:
causing the wick to burn faster, when the wick is used in a candle, relative to an undyed wick; and
causing the wick to produce a larger flame, when the wick is used in a candle, relative to an undyed wick.

9. The wick according to claim 8, wherein the dyeing material is at least one selected from the group consisting of a food dye, an alcohol dye, a natural dye, an acid dye, a solvent dye, a sulfur dye, a reactive dye, and a substantive dye.

10. The wick according to claim 8, wherein:
the wick is formed by laser cutting a wood, a semi-wood or a wood-like material;
the wick is dyed in a single color; and
the wick has a thickness of 0.60 inches or less.

11. A candle, comprising the wick according to claim 8 and a meltable fuel.

* * * * *